United States Patent
Mullen et al.

(10) Patent No.: US 10,504,105 B2
(45) Date of Patent: Dec. 10, 2019

(54) SYSTEMS AND METHODS FOR CARDS AND DEVICES OPERABLE TO COMMUNICATE TO TOUCH SENSITIVE DISPLAYS

(75) Inventors: Jeffrey D. Mullen, Pittsburgh, PA (US); David J. Hartwick, Aliquippa, PA (US)

(73) Assignee: DYNAMICS INC., Pittsburgh, PA (US)

( * ) Notice: Subject to any disclaimer, the term of this patent is extended or adjusted under 35 U.S.C. 154(b) by 0 days.

(21) Appl. No.: 13/110,498

(22) Filed: May 18, 2011

(65) Prior Publication Data

US 2011/0284632 A1 Nov. 24, 2011

Related U.S. Application Data

(60) Provisional application No. 61/345,649, filed on May 18, 2010, provisional application No. 61/345,659, filed on May 18, 2010.

(51) Int. Cl.
*G06Q 20/34* (2012.01)
*G06F 3/041* (2006.01)
*G06F 3/044* (2006.01)
*G07F 7/08* (2006.01)

(52) U.S. Cl.
CPC ........... *G06Q 20/352* (2013.01); *G06F 3/044* (2013.01); *G06F 3/0416* (2013.01); *G07F 7/088* (2013.01); *G07F 7/0833* (2013.01); *G07F 7/0853* (2013.01)

(58) Field of Classification Search
CPC .................................................. G06Q 20/352
USPC ........................................................ 235/380
See application file for complete search history.

(56) References Cited

U.S. PATENT DOCUMENTS

| | | |
|---|---|---|
| 4,353,064 A | 10/1982 | Stamm |
| 4,394,654 A | 7/1983 | Hofmann-Cerfontaine |
| 4,614,861 A | 9/1986 | Pavlov et al. |
| 4,667,087 A | 5/1987 | Quintana |
| 4,701,601 A | 10/1987 | Francini et al. |
| 4,720,860 A | 1/1988 | Weiss |
| 4,786,791 A | 11/1988 | Hodama |
| 4,791,283 A | 12/1988 | Burkhardt |
| 4,797,542 A | 1/1989 | Hara |
| 5,038,251 A | 8/1991 | Sugiyama et al. |
| 5,168,520 A | 12/1992 | Weiss |
| 5,237,614 A | 8/1993 | Weiss |
| 5,276,311 A | 1/1994 | Hennige |

(Continued)

FOREIGN PATENT DOCUMENTS

| | | |
|---|---|---|
| JP | 05210770 A | 8/1993 |
| JP | H06-150078 | 5/1994 |

(Continued)

OTHER PUBLICATIONS

Wiley, John. Dictionary of Communications Technology: Terms, Definitions and Abbreviations. 1998 [retrieved on Sep. 14, 2012]. Retrieved from the Internet: <URL: http://www.credoreference.com/entry/wileycommtech/isolation >.*

(Continued)

*Primary Examiner* — Toan Ly

(57) ABSTRACT

A card is provided with a touch transmitter operable to electrically communicate touch signals to a touch-sensitive screen such as a capacitive touch sensitive screen. In doing so, for example, a card may directly communicate with a mobile telephonic device or portable computer (e.g., a tablet computer).

19 Claims, 17 Drawing Sheets

(56) References Cited

U.S. PATENT DOCUMENTS

| | | |
|---|---|---|
| 5,291,068 A | 3/1994 | Rammel et al. |
| 5,347,580 A | 9/1994 | Molva et al. |
| 5,361,062 A | 11/1994 | Weiss et al. |
| 5,412,199 A | 5/1995 | Finkelstein et al. |
| 5,416,280 A * | 5/1995 | McDermott et al. ...... 178/20.04 |
| 5,434,398 A | 7/1995 | Goldberg |
| 5,434,405 A | 7/1995 | Finkelstein et al. |
| 5,478,994 A | 12/1995 | Rahman |
| 5,479,512 A | 12/1995 | Weiss |
| 5,484,997 A | 1/1996 | Haynes |
| 5,485,519 A | 1/1996 | Weiss |
| 5,585,787 A | 12/1996 | Wallerstein |
| 5,591,949 A | 1/1997 | Bernstein |
| 5,608,203 A | 3/1997 | Finkelstein et al. |
| 5,623,552 A | 4/1997 | Lane |
| 5,657,388 A | 8/1997 | Weiss |
| 5,834,747 A | 11/1998 | Cooper |
| 5,834,756 A | 11/1998 | Gutman et al. |
| 5,856,661 A | 1/1999 | Finkelstein et al. |
| 5,864,623 A | 1/1999 | Messina et al. |
| 5,907,142 A | 5/1999 | Kelsey |
| 5,907,350 A | 5/1999 | Nemirofsky |
| 5,913,203 A | 6/1999 | Wong et al. |
| 5,937,394 A | 8/1999 | Wong et al. |
| 5,955,021 A | 9/1999 | Tiffany, III |
| 5,956,699 A | 9/1999 | Wong et al. |
| 6,005,691 A | 12/1999 | Grot et al. |
| 6,025,054 A | 2/2000 | Tiffany, III |
| 6,045,043 A | 4/2000 | Bashan et al. |
| 6,076,163 A | 6/2000 | Hoffstein et al. |
| 6,085,320 A | 7/2000 | Kaliski |
| 6,095,416 A | 8/2000 | Grant et al. |
| 6,118,205 A * | 9/2000 | Wood et al. ............. 310/316.01 |
| 6,130,621 A | 10/2000 | Weiss |
| 6,145,079 A | 11/2000 | Mitty et al. |
| 6,157,920 A | 12/2000 | Jakobsson et al. |
| 6,161,181 A | 12/2000 | Haynes, III et al. |
| 6,163,313 A * | 12/2000 | Aroyan et al. ................ 345/173 |
| 6,176,430 B1 | 1/2001 | Finkelstein et al. |
| 6,182,894 B1 | 2/2001 | Hackett et al. |
| 6,189,098 B1 | 2/2001 | Kaliski |
| 6,199,052 B1 | 3/2001 | Mitty et al. |
| 6,206,293 B1 | 3/2001 | Gutman et al. |
| 6,240,184 B1 | 5/2001 | Huynh et al. |
| 6,241,153 B1 | 6/2001 | Tiffany, III |
| 6,256,873 B1 | 7/2001 | Tiffany, III |
| 6,269,163 B1 | 7/2001 | Rivest et al. |
| 6,286,022 B1 | 9/2001 | Kaliski et al. |
| 6,308,890 B1 | 10/2001 | Cooper |
| 6,313,724 B1 | 11/2001 | Osterweil |
| 6,389,442 B1 | 5/2002 | Yin et al. |
| 6,393,447 B1 | 5/2002 | Jakobsson et al. |
| 6,411,715 B1 | 6/2002 | Liskov et al. |
| 6,431,439 B1 | 8/2002 | Suer et al. |
| 6,446,052 B1 | 9/2002 | Juels |
| 6,460,141 B1 | 10/2002 | Olden |
| 6,592,044 B1 | 7/2003 | Wong et al. |
| 6,607,127 B2 | 8/2003 | Wong |
| 6,609,654 B1 | 8/2003 | Anderson et al. |
| 6,631,849 B2 | 10/2003 | Blossom |
| 6,655,585 B2 | 12/2003 | Shinn |
| 6,681,988 B2 | 1/2004 | Stack et al. |
| 6,705,520 B1 | 3/2004 | Pitroda et al. |
| 6,755,341 B1 | 6/2004 | Wong et al. |
| 6,764,005 B2 | 7/2004 | Cooper |
| 6,769,618 B1 | 8/2004 | Finkelstein |
| 6,805,288 B2 | 10/2004 | Routhenstein et al. |
| 6,811,082 B2 | 11/2004 | Wong |
| 6,813,354 B1 | 11/2004 | Jakobsson et al. |
| 6,817,532 B2 | 11/2004 | Finkelstein |
| 6,820,804 B2 | 11/2004 | Segal et al. |
| 6,873,974 B1 | 3/2005 | Schutzer |
| 6,902,116 B2 | 6/2005 | Finkelstein |
| 6,970,070 B2 | 11/2005 | Juels et al. |
| 6,980,969 B1 | 12/2005 | Tuchler et al. |
| 6,985,583 B1 | 1/2006 | Brainard et al. |
| 6,991,155 B2 | 1/2006 | Burchette, Jr. |
| 7,013,030 B2 | 3/2006 | Wong et al. |
| 7,035,443 B2 | 4/2006 | Wong |
| 7,039,223 B2 | 5/2006 | Wong |
| 7,044,394 B2 | 5/2006 | Brown |
| 7,051,929 B2 | 5/2006 | Li |
| 7,083,094 B2 | 8/2006 | Cooper |
| 7,100,049 B2 | 8/2006 | Gasparini et al. |
| 7,100,821 B2 | 9/2006 | Rasti |
| 7,111,172 B1 | 9/2006 | Duane et al. |
| 7,114,652 B2 | 10/2006 | Moullette et al. |
| 7,136,514 B1 | 11/2006 | Wong |
| 7,140,550 B2 | 11/2006 | Ramachandran |
| 7,163,153 B2 | 1/2007 | Blossom |
| 7,195,154 B2 | 3/2007 | Routhenstein |
| 7,197,639 B1 | 3/2007 | Juels et al. |
| 7,219,368 B2 | 5/2007 | Juels et al. |
| 7,225,537 B2 | 6/2007 | Reed |
| 7,225,994 B2 | 6/2007 | Finkelstein |
| 7,246,752 B2 | 7/2007 | Brown |
| 7,298,243 B2 | 11/2007 | Juels et al. |
| 7,306,144 B2 | 12/2007 | Moore |
| 7,334,732 B2 | 2/2008 | Cooper |
| 7,337,326 B2 | 2/2008 | Palmer et al. |
| 7,346,775 B2 | 3/2008 | Gasparini et al. |
| 7,356,696 B1 | 4/2008 | Jakobsson et al. |
| 7,357,319 B1 | 4/2008 | Lin et al. |
| 7,359,507 B2 | 4/2008 | Kaliski |
| 7,360,688 B1 | 4/2008 | Harris |
| 7,363,494 B2 | 4/2008 | Brainard et al. |
| 7,380,710 B2 | 6/2008 | Brown |
| 7,398,253 B1 | 7/2008 | Pinnell |
| 7,404,087 B2 | 7/2008 | Teunen |
| 7,424,570 B2 | 9/2008 | D'Albore et al. |
| 7,427,033 B1 | 9/2008 | Roskind |
| 7,454,349 B2 | 11/2008 | Teunen et al. |
| 7,461,250 B1 | 12/2008 | Duane et al. |
| 7,461,399 B2 | 12/2008 | Juels et al. |
| 7,472,093 B2 | 12/2008 | Juels |
| 7,472,829 B2 | 1/2009 | Brown |
| 7,494,055 B2 | 2/2009 | Fernandes et al. |
| 7,502,467 B2 | 3/2009 | Brainard et al. |
| 7,502,933 B2 | 3/2009 | Jakobsson et al. |
| 7,503,485 B1 | 3/2009 | Routhenstein |
| 7,516,492 B1 | 4/2009 | Nisbet et al. |
| 7,523,301 B2 | 4/2009 | Nisbet et al. |
| 7,530,495 B2 | 5/2009 | Cooper |
| 7,532,104 B2 | 5/2009 | Juels |
| 7,543,739 B2 | 6/2009 | Brown et al. |
| 7,559,464 B2 | 7/2009 | Routhenstein |
| 7,562,221 B2 | 7/2009 | Nystrom et al. |
| 7,562,222 B2 | 7/2009 | Gasparini et al. |
| 7,580,898 B2 | 8/2009 | Brown et al. |
| 7,584,153 B2 | 9/2009 | Brown et al. |
| 7,591,426 B2 | 9/2009 | Osterweil et al. |
| 7,591,427 B2 | 9/2009 | Osterweil |
| 7,602,904 B2 | 10/2009 | Juels et al. |
| 7,627,879 B2 | 12/2009 | Koplar |
| 7,631,804 B2 | 12/2009 | Brown |
| 7,639,537 B2 | 12/2009 | Sepe et al. |
| 7,641,124 B2 | 1/2010 | Brown et al. |
| 7,660,902 B2 | 2/2010 | Graham et al. |
| 7,784,687 B2 | 8/2010 | Mullen et al. |
| 7,793,851 B2 | 9/2010 | Mullen |
| 7,828,207 B2 | 11/2010 | Cooper |
| 7,828,220 B2 | 11/2010 | Mullen |
| 7,931,195 B2 | 4/2011 | Mullen |
| 7,954,705 B2 | 6/2011 | Mullen |
| 8,000,979 B2 * | 8/2011 | Blom ............................... 705/2 |
| 8,011,577 B2 | 9/2011 | Mullen et al. |
| 8,020,775 B2 | 9/2011 | Mullen et al. |
| 8,066,191 B1 | 11/2011 | Cloutier et al. |
| 8,074,877 B2 | 12/2011 | Mullen et al. |
| 8,100,333 B2 | 1/2012 | Reynolds et al. |
| 8,172,148 B1 | 5/2012 | Cloutier et al. |
| 8,282,007 B1 | 10/2012 | Cloutier et al. |
| 8,286,876 B2 | 10/2012 | Mullen et al. |
| 8,302,872 B2 | 11/2012 | Mullen |

(56) References Cited

U.S. PATENT DOCUMENTS

| | | |
|---|---|---|
| 8,348,172 B1 | 1/2013 | Cloutier et al. |
| 8,382,000 B2 | 2/2013 | Mullen et al. |
| 8,393,545 B1 | 3/2013 | Mullen et al. |
| 8,393,546 B1 | 3/2013 | Yen et al. |
| 8,413,892 B2 | 4/2013 | Mullen et al. |
| 8,424,773 B2 | 4/2013 | Mullen et al. |
| 8,459,548 B2 | 6/2013 | Mullen et al. |
| 8,485,437 B2 | 7/2013 | Mullen et al. |
| 8,511,574 B1 | 8/2013 | Yen et al. |
| 8,517,276 B2 | 8/2013 | Mullen et al. |
| 8,523,059 B1 | 9/2013 | Mullen et al. |
| 8,573,503 B1 | 11/2013 | Cloutier et al. |
| 8,579,203 B1 | 11/2013 | Lambeth et al. |
| 8,590,796 B1 | 11/2013 | Cloutier et al. |
| 8,602,312 B2 | 12/2013 | Cloutier et al. |
| 8,608,083 B2 | 12/2013 | Mullen et al. |
| 8,622,309 B1 | 1/2014 | Mullen et al. |
| 8,668,143 B2 | 3/2014 | Mullen et al. |
| 8,727,219 B1 | 5/2014 | Mullen |
| 8,733,638 B2 | 5/2014 | Mullen et al. |
| 8,746,579 B1 | 6/2014 | Cloutier et al. |
| 8,757,483 B1 | 6/2014 | Mullen et al. |
| 8,757,499 B2 | 6/2014 | Cloutier et al. |
| 8,814,050 B1 | 8/2014 | Mullen et al. |
| 8,875,999 B2 | 11/2014 | Mullen et al. |
| 8,881,989 B2 | 11/2014 | Mullen et al. |
| 8,973,824 B2 | 3/2015 | Mullen et al. |
| 9,004,368 B2 | 4/2015 | Mullen et al. |
| 9,010,630 B2 | 4/2015 | Mullen et al. |
| 9,064,255 B1 | 6/2015 | Mullen et al. |
| 9,292,843 B1 | 3/2016 | Mullen et al. |
| 9,306,666 B1 | 4/2016 | Zhang et al. |
| 9,329,619 B1 | 5/2016 | Cloutier |
| 9,361,569 B2 | 6/2016 | Mullen et al. |
| 9,373,069 B2 | 6/2016 | Cloutier et al. |
| 9,384,438 B2 | 7/2016 | Mullen et al. |
| 9,639,796 B2 | 5/2017 | Mullen et al. |
| 9,652,436 B1 | 5/2017 | Yen et al. |
| 9,684,861 B2 | 6/2017 | Mullen et al. |
| 9,697,454 B2 | 7/2017 | Mullen et al. |
| 9,704,088 B2 | 7/2017 | Mullen et al. |
| 9,704,089 B2 | 7/2017 | Mullen et al. |
| 9,727,813 B2 | 8/2017 | Mullen et al. |
| 9,805,297 B2 | 10/2017 | Mullen et al. |
| 9,852,368 B1 | 12/2017 | Yen et al. |
| 9,928,456 B1 | 3/2018 | Cloutier et al. |
| 9,953,255 B1 | 4/2018 | Yen et al. |
| 10,032,100 B2 | 7/2018 | Mullen et al. |
| 10,095,974 B1 | 10/2018 | Mullen et al. |
| 10,169,692 B2 | 1/2019 | Mullen et al. |
| 10,176,419 B1 | 1/2019 | Cloutier et al. |
| 10,181,097 B1 | 1/2019 | Mullen et al. |
| 10,198,687 B2 | 2/2019 | Mullen et al. |
| 10,223,631 B2 | 3/2019 | Mullen et al. |
| 10,255,545 B2 | 4/2019 | Mullen et al. |
| 2001/0034702 A1 | 10/2001 | Mockett et al. |
| 2001/0047335 A1 | 11/2001 | Arndt et al. |
| 2002/0050983 A1* | 5/2002 | Liu et al. .................. 345/173 |
| 2002/0059114 A1 | 5/2002 | Cockrill et al. |
| 2002/0082989 A1 | 6/2002 | Fife et al. |
| 2002/0096570 A1 | 7/2002 | Wong et al. |
| 2002/0120583 A1 | 8/2002 | Keresman, III et al. |
| 2003/0034388 A1 | 2/2003 | Routhenstein et al. |
| 2003/0052168 A1 | 3/2003 | Wong |
| 2003/0057278 A1 | 3/2003 | Wong |
| 2003/0116635 A1 | 6/2003 | Taban |
| 2003/0152253 A1 | 8/2003 | Wong |
| 2003/0163287 A1 | 8/2003 | Vock et al. |
| 2003/0173409 A1 | 9/2003 | Vogt et al. |
| 2003/0179909 A1 | 9/2003 | Wong et al. |
| 2003/0179910 A1 | 9/2003 | Wong |
| 2003/0226899 A1 | 12/2003 | Finkelstein |
| 2004/0035942 A1 | 2/2004 | Silverman |
| 2004/0133787 A1 | 7/2004 | Doughty |
| 2004/0162732 A1 | 8/2004 | Rahim et al. |
| 2004/0172535 A1 | 9/2004 | Jakobsson |
| 2004/0177045 A1 | 9/2004 | Brown |
| 2005/0033688 A1* | 2/2005 | Peart et al. .................. 705/39 |
| 2005/0043997 A1 | 2/2005 | Sahota et al. |
| 2005/0080747 A1 | 4/2005 | Anderson et al. |
| 2005/0086160 A1 | 4/2005 | Wong et al. |
| 2005/0086177 A1 | 4/2005 | Anderson et al. |
| 2005/0116026 A1 | 6/2005 | Burger et al. |
| 2005/0119940 A1 | 6/2005 | Concilio et al. |
| 2005/0154643 A1 | 7/2005 | Doan et al. |
| 2005/0203765 A1* | 9/2005 | Maritzen ............ G06Q 20/10 705/26.1 |
| 2005/0228959 A1 | 10/2005 | D'Albore et al. |
| 2006/0000900 A1 | 1/2006 | Fernandes et al. |
| 2006/0037073 A1 | 2/2006 | Juels et al. |
| 2006/0041759 A1 | 2/2006 | Kaliski et al. |
| 2006/0085328 A1 | 4/2006 | Cohen et al. |
| 2006/0091223 A1 | 5/2006 | Zellner |
| 2006/0161435 A1 | 7/2006 | Atef et al. |
| 2006/0163353 A1 | 7/2006 | Moulette et al. |
| 2006/0174104 A1 | 8/2006 | Crichton et al. |
| 2006/0196931 A1 | 9/2006 | Holtmanns et al. |
| 2006/0256961 A1 | 11/2006 | Brainard et al. |
| 2006/0289632 A1 | 12/2006 | Walker et al. |
| 2007/0034700 A1 | 2/2007 | Poidomani et al. |
| 2007/0040683 A1 | 2/2007 | Oliver et al. |
| 2007/0062852 A1* | 3/2007 | Zachut ............ A63F 3/00643 209/683 |
| 2007/0114274 A1 | 5/2007 | Gibbs et al. |
| 2007/0124321 A1 | 5/2007 | Szydlo |
| 2007/0152070 A1 | 7/2007 | D'Albore |
| 2007/0152072 A1 | 7/2007 | Frallicciardi et al. |
| 2007/0153487 A1 | 7/2007 | Frallicciardi et al. |
| 2007/0174614 A1 | 7/2007 | Duane et al. |
| 2007/0241183 A1* | 10/2007 | Brown et al. .................. 235/380 |
| 2007/0241201 A1 | 10/2007 | Brown et al. |
| 2007/0256123 A1 | 11/2007 | Duane et al. |
| 2007/0192249 A1 | 12/2007 | Biffle et al. |
| 2007/0291753 A1 | 12/2007 | Romano |
| 2008/0005510 A1 | 1/2008 | Sepe et al. |
| 2008/0008315 A1 | 1/2008 | Fontana et al. |
| 2008/0008322 A1 | 1/2008 | Fontana et al. |
| 2008/0010675 A1 | 1/2008 | Massascusa et al. |
| 2008/0016351 A1 | 1/2008 | Fontana et al. |
| 2008/0019507 A1 | 1/2008 | Fontana et al. |
| 2008/0028447 A1 | 1/2008 | O'Malley et al. |
| 2008/0029607 A1 | 2/2008 | Mullen |
| 2008/0035738 A1 | 2/2008 | Mullen |
| 2008/0040271 A1 | 2/2008 | Hammad et al. |
| 2008/0040276 A1 | 2/2008 | Hammad et al. |
| 2008/0054068 A1 | 3/2008 | Mullen |
| 2008/0054079 A1 | 3/2008 | Mullen |
| 2008/0054081 A1 | 3/2008 | Mullen |
| 2008/0058016 A1 | 3/2008 | Di Maggio et al. |
| 2008/0059379 A1 | 3/2008 | Ramaci et al. |
| 2008/0065555 A1 | 3/2008 | Mullen |
| 2008/0096326 A1 | 4/2008 | Reed |
| 2008/0126398 A1 | 5/2008 | Cimino |
| 2008/0128515 A1 | 6/2008 | Di Iorio |
| 2008/0148394 A1 | 6/2008 | Poidomani et al. |
| 2008/0201264 A1 | 8/2008 | Brown et al. |
| 2008/0209550 A1 | 8/2008 | Di Iorio |
| 2008/0288699 A1 | 11/2008 | Chichierchia |
| 2008/0294930 A1 | 11/2008 | Varone et al. |
| 2008/0302869 A1 | 12/2008 | Mullen |
| 2008/0302876 A1 | 12/2008 | Mullen |
| 2008/0302877 A1 | 12/2008 | Musella et al. |
| 2009/0013122 A1 | 1/2009 | Sepe et al. |
| 2009/0036147 A1 | 2/2009 | Romano |
| 2009/0039149 A1 | 2/2009 | Top |
| 2009/0046522 A1 | 2/2009 | Sepe et al. |
| 2009/0108064 A1 | 4/2009 | Fernandes et al. |
| 2009/0150295 A1 | 6/2009 | Hatch et al. |
| 2009/0152365 A1 | 6/2009 | Li et al. |
| 2009/0159663 A1 | 6/2009 | Mullen et al. |
| 2009/0159667 A1 | 6/2009 | Mullen et al. |
| 2009/0159668 A1 | 6/2009 | Mullen et al. |
| 2009/0159669 A1 | 6/2009 | Mullen et al. |
| 2009/0159670 A1 | 6/2009 | Mullen et al. |

(56) References Cited

U.S. PATENT DOCUMENTS

| | | |
|---|---|---|
| 2009/0159671 A1 | 6/2009 | Mullen et al. |
| 2009/0159672 A1 | 6/2009 | Mullen et al. |
| 2009/0159673 A1 | 6/2009 | Mullen et al. |
| 2009/0159680 A1 | 6/2009 | Mullen et al. |
| 2009/0159681 A1 | 6/2009 | Mullen et al. |
| 2009/0159682 A1 | 6/2009 | Mullen et al. |
| 2009/0159688 A1 | 6/2009 | Mullen et al. |
| 2009/0159689 A1 | 6/2009 | Mullen et al. |
| 2009/0159690 A1 | 6/2009 | Mullen et al. |
| 2009/0159696 A1 | 6/2009 | Mullen |
| 2009/0159697 A1 | 6/2009 | Mullen et al. |
| 2009/0159698 A1 | 6/2009 | Mullen et al. |
| 2009/0159699 A1 | 6/2009 | Mullen et al. |
| 2009/0159700 A1 | 6/2009 | Mullen et al. |
| 2009/0159701 A1 | 6/2009 | Mullen et al. |
| 2009/0159702 A1 | 6/2009 | Mullen |
| 2009/0159703 A1 | 6/2009 | Mullen et al. |
| 2009/0159704 A1 | 6/2009 | Mullen et al. |
| 2009/0159705 A1 | 6/2009 | Mullen et al. |
| 2009/0159706 A1 | 6/2009 | Mullen et al. |
| 2009/0159707 A1 | 6/2009 | Mullen et al. |
| 2009/0159708 A1 | 6/2009 | Mullen et al. |
| 2009/0159709 A1 | 6/2009 | Mullen |
| 2009/0159710 A1 | 6/2009 | Mullen et al. |
| 2009/0159711 A1 | 6/2009 | Mullen et al. |
| 2009/0159712 A1 | 6/2009 | Mullen et al. |
| 2009/0159713 A1 | 6/2009 | Mullen et al. |
| 2009/0160617 A1 | 6/2009 | Mullen et al. |
| 2009/0242648 A1 | 10/2009 | Di Sirio et al. |
| 2009/0244858 A1 | 10/2009 | Di Sirio et al. |
| 2009/0253460 A1 | 10/2009 | Varone et al. |
| 2009/0255996 A1 | 10/2009 | Brown et al. |
| 2009/0273442 A1 | 11/2009 | Ozoloins |
| 2009/0290704 A1 | 11/2009 | Cimino |
| 2009/0303885 A1 | 12/2009 | Longo |
| 2009/0308921 A1 | 12/2009 | Mullen |
| 2010/0045627 A1 | 2/2010 | Kennedy |
| 2010/0066701 A1 | 3/2010 | Ningrat |
| 2010/0108771 A1 | 5/2010 | Wong et al. |
| 2010/0302144 A1* | 12/2010 | Burtner ............... G06F 3/0416 345/157 |
| 2011/0028184 A1 | 2/2011 | Cooper |
| 2011/0272465 A1 | 11/2011 | Mullen et al. |
| 2011/0272466 A1 | 11/2011 | Mullen et al. |
| 2011/0272467 A1 | 11/2011 | Mullen et al. |
| 2011/0272471 A1 | 11/2011 | Mullen |
| 2011/0272472 A1 | 11/2011 | Mullen |
| 2011/0272473 A1 | 11/2011 | Mullen et al. |
| 2011/0272474 A1 | 11/2011 | Mullen et al. |
| 2011/0272475 A1 | 11/2011 | Mullen et al. |
| 2011/0272476 A1 | 11/2011 | Mullen et al. |
| 2011/0272477 A1 | 11/2011 | Mullen et al. |
| 2011/0272478 A1 | 11/2011 | Mullen |
| 2011/0272479 A1 | 11/2011 | Mullen |
| 2011/0272480 A1 | 11/2011 | Mullen et al. |
| 2011/0272481 A1 | 11/2011 | Mullen et al. |
| 2011/0272482 A1 | 11/2011 | Mullen et al. |
| 2011/0272483 A1 | 11/2011 | Mullen et al. |
| 2011/0272484 A1 | 11/2011 | Mullen et al. |
| 2011/0276380 A1 | 11/2011 | Mullen et al. |
| 2011/0276381 A1 | 11/2011 | Mullen et al. |
| 2011/0276416 A1 | 11/2011 | Mullen et al. |
| 2011/0276424 A1 | 11/2011 | Mullen |
| 2011/0276425 A1 | 11/2011 | Mullen |
| 2011/0276436 A1 | 11/2011 | Mullen et al. |
| 2011/0276437 A1 | 11/2011 | Mullen et al. |
| 2011/0278364 A1 | 11/2011 | Mullen et al. |
| 2011/0282753 A1 | 11/2011 | Mullen et al. |
| 2011/0298721 A1* | 12/2011 | Eldridge ....................... 345/173 |
| 2012/0037709 A1 | 2/2012 | Cloutier et al. |
| 2012/0286037 A1 | 11/2012 | Mullen et al. |
| 2012/0318871 A1 | 12/2012 | Mullen et al. |
| 2012/0326013 A1 | 12/2012 | Cloutier et al. |
| 2013/0020396 A1 | 1/2013 | Mullen et al. |
| 2013/0194192 A1* | 8/2013 | Andolina ............... G06K 9/186 345/173 |
| 2013/0282573 A1 | 10/2013 | Mullen et al. |
| 2013/0282575 A1 | 10/2013 | Mullen et al. |
| 2014/0054384 A1 | 2/2014 | Cloutier et al. |
| 2015/0186766 A1 | 7/2015 | Mullen et al. |
| 2016/0162713 A1 | 6/2016 | Cloutier et al. |
| 2016/0180209 A1 | 6/2016 | Mullen et al. |
| 2016/0239735 A1 | 8/2016 | Mullen et al. |
| 2016/0283837 A1 | 9/2016 | Mullen et al. |
| 2016/0307085 A1 | 10/2016 | Mullen et al. |
| 2016/0335529 A1 | 11/2016 | Mullen et al. |
| 2016/0342876 A1 | 11/2016 | Mullen et al. |
| 2016/0342877 A1 | 11/2016 | Mullen et al. |
| 2016/0342878 A1 | 11/2016 | Mullen et al. |
| 2016/0342879 A1 | 11/2016 | Mullen et al. |
| 2016/0342880 A1 | 11/2016 | Mullen et al. |
| 2017/0300796 A1 | 10/2017 | Mullen et al. |
| 2018/0053079 A1 | 2/2018 | Cloutier et al. |

FOREIGN PATENT DOCUMENTS

| | | |
|---|---|---|
| JP | 2010-044730 | 2/2010 |
| WO | WO9852735 | 11/1998 |
| WO | WO0247019 | 6/2002 |
| WO | WO06066322 | 6/2006 |
| WO | WO06080929 | 8/2006 |
| WO | WO06105092 | 10/2006 |
| WO | WO06116772 | 11/2006 |
| WO | WO08064403 | 6/2008 |
| WO | PCT/US11/25047 | 2/2011 |
| WO | PCT/US11/37041 | 5/2011 |
| WO | PCT/US11/45991 | 7/2011 |
| WO | PCT/US13/26746 | 2/2012 |
| WO | PCT/US12/31919 | 4/2012 |
| WO | PCT/US12/31921 | 4/2012 |
| WO | PCT/US12/37237 | 5/2012 |

OTHER PUBLICATIONS

USPTO, International Search Report, dated Sep. 9, 2011.
U.S. Appl. No. 60/594,300, filed Jun. 19, 2008, Poidomani et al.
U.S. Appl. No. 60/675,388, filed Feb. 15, 2007, Poidomani et al.
The Bank Credit Card Business. Second Edition, American Bankers Association, Washington, D.C., 1996.
A Day in the Life of a Flux Reversal. http://www.phrack.org/issues. html?issue=37&id=6#article. As viewed on Apr. 12, 2010.
Dynamic Virtual Credit Card Numbers. http://homes.cerias.purdue. edu/~jtli/paper/fc07.pdf. As viewed on Apr. 12, 2010.
English translation of JP 05210770 A.
Partial European Search Report dated Jun. 25, 2015 in European Patent Application No. 11784196.
English abstract of JP H06-150078.
English abstract of JP 2010-044730.
Office Action dated Mar. 16, 2015 in Japanese Patent App. No. 2013-511340.

* cited by examiner

SYSTEMS AND METHODS FOR CARDS AND DEVICES OPERABLE TO COMMUNICATE TO TOUCH SENSITIVE DISPLAYS

CROSS-REFERENCE TO RELATED APPLICATION

This application claims the benefit of U.S. Provisional Pat. App. No. 61/345,649, titled "SYSTEMS AND METHODS FOR CARDS AND DEVICES OPERABLE TO COMMUNICATE TO TOUCH SENSITIVE DISPLAYS," filed May 18, 2010 and U.S. Provisional Pat. App. No. 61/345,659, titled "SYSTEMS AND METHODS FOR CARDS AND DEVICES OPERABLE TO COMMUNICATE VIA LIGHT PULSING," filed May 18, 2010, all of which are hereby incorporated by reference herein in their entirety.

BACKGROUND OF THE INVENTION

This invention relates to magnetic cards and devices and associated payment systems.

SUMMARY OF THE INVENTION

A card may include a dynamic magnetic communications device. Such a dynamic magnetic communications device may take the form of a magnetic encoder or a magnetic emulator. A magnetic encoder may change the information located on a magnetic medium such that a magnetic stripe reader may read changed magnetic information from the magnetic medium. A magnetic emulator may generate electromagnetic fields that directly communicate data to a magnetic stripe reader. Such a magnetic emulator may communicate data serially to a read-head of the magnetic stripe reader.

All, or substantially all, of the front as well as the back of a card may be a display (e.g., bi-stable, non bi-stable, LCD, LED, or electrochromic display). Electrodes of a display may be coupled to one or more capacitive touch sensors such that a display may be provided as a touch-screen display. Any type of touch-screen display may be utilized. Such touch-screen displays may be operable of determining multiple points of touch. Accordingly, a barcode may be displayed across all, or substantially all, of a surface of a card. In doing so, computer vision equipment such as barcode readers may be less susceptible to errors in reading a displayed barcode.

A card may include a number of output devices to output dynamic information. For example, a card may include one or more RFIDs or IC chips to communicate to one or more RFID readers or IC chip readers, respectively. A card may include devices to receive information. For example, an RFID and IC chip may both receive information and communicate information to an RFID and IC chip reader, respectively. A device for receiving wireless information signals may be provided. A light sensing device or sound sensing device may be utilized to receive information wirelessly. A card may include a central processor that communicates data through one or more output devices simultaneously (e.g., an RFID, IC chip, and a dynamic magnetic stripe communications device). The central processor may receive information from one or more input devices simultaneously (e.g., an RFID, IC chip, dynamic magnetic stripe devices, light sensing device, and a sound sensing device). A processor may be coupled to surface contacts such that the processor may perform the processing capabilities of, for example, an EMV chip. The processor may be laminated over and not exposed such that such a processor is not exposed on the surface of the card.

A card may be provided with a button in which the activation of the button causes a code to be communicated through a dynamic magnetic stripe communications device (e.g., the subsequent time a read-head detector on the card detects a read-head). The code may be indicative of, for example, a feature (e.g., a payment feature). The code may be received by the card via manual input (e.g., onto buttons of the card) or via a wireless transmission (e.g., via light, electromagnetic communications, sound, or other wireless signals). A code may be communicated from a webpage (e.g., via light and/or sound) to a card. A card may include a display such that a received code may be visually displayed to a user. In doing so, the user may be provided with a way to select, and use, the code via both an in-store setting (e.g., via a magnetic stripe reader) or an online setting (e.g., by reading the code from a display and entering the code into a text box on a checkout page of an online purchase transaction). A remote server, such as a payment authorization server, may receive the code and may process a payment differently based on the code received. For example, a code may be a security code to authorize a purchase transaction. A code may provide a payment feature such that a purchase may be made with points, debit, credit, installment payments, or deferred payments via a single payment account number (e.g., a credit card number) to identify a user and a payment feature code to select the type of payment a user desires to utilize.

A dynamic magnetic stripe communications device may include a magnetic emulator that comprises an inductor (e.g., a coil). Current may be provided through this coil to create an electromagnetic field operable to communicate with the read-head of a magnetic stripe reader. The drive circuit may fluctuate the amount of current travelling through the coil such that a track of magnetic stripe data may be communicated to a read-head of a magnetic stripe reader. A switch (e.g., a transistor) may be provided to enable or disable the flow of current according to, for example, a frequency/double-frequency (F2F) encoding algorithm. In doing so, bits of data may be communicated.

A card may include a touch transmitter that may activate a capacitive touch sensor on another device such that the other device believes a user physically touched the capacitive touch sensor with his/her finger. Accordingly, a touch transmitter may activate a capacitive touch screen, such as a capacitive touch screen located on a mobile telephonic device, tablet computing device, or a capacitive touch screen of a laptop or stationary computer. The touch transmitter may, accordingly, communicate information to a device (e.g., to a mobile telephonic device) by activating and deactivating a touch sensor (or sensors) on a capacitive touch screen in a particular manner. For example, a touch transmitter may communicate information serially by activating and deactivating a capacitive touch screen sensor with respect to time. A touch transmitter may, accordingly, communicate information via a capacitive touch sensor using F2F encoding, where a state transition occurs either at an activation or, for example, at an activation as well as a deactivation. In this manner, a card may communicate information directly to a mobile telephonic device with a capacitive touch screen, or any device with a capacitive touch screen, without requiring any physical connections or the use of proprietary communication protocols. A software program may run on the device having the touch screen that is operable to determine information provided by one or more touch transmitters from a device such as a battery-powered payment card. The software program may, for example, determine different bits of information by measuring the time between state transitions. For example, a particular time period between state transitions may be determined as one bit of information (e.g., a "0" or "1," respectively). A another particular time period between state transitions may be determined as a different bit of information (e.g., a "1" or a "0," respectively). A message provided from a touch transmitter may initially include a string of a particular length of a particular bit (e.g., four or five bits) such that the software program may lock onto, track, and determine the time duration of that particular bit such that future received bits may be properly determined. One particular time period associated with one bit of information may be approximately twice as long in duration as another particular time period associated with a different bit of information.

A card, or other device, may utilize one or more touch transmitters to communicate any type of information. For example, a card may utilize a touch transmitter to communicate a payment card number, and associated data (e.g., associated discretionary data such as payment codes and expiration date), such that a payment purchase may be completed. For example, a card may utilize a touch transmitter to communicate track 1, track 2, and/or track 3 magnetic stripe information to a device. A software program may be provided on the device receiving the magnetic stripe information that completes a purchase transaction based on the magnetic stripe data received from the touch screen. As per another example, a card may communicate information indicative of one or more user selections on the card such that user selections may be communicated to a capacitive touch screen (e.g., in addition to payment data and/or other data). As per yet another example, messages may be communicated to a device having a capacitive touch screen to provide the device with status on a communication. For example, a card may communicate a message to a device, via its capacitive touch screen, that a message is about to be sent or a message has completed transfer. The card may also communicate identification and password information such that the card may securely identify itself to a device.

The card may receive information from a device having a capacitive touch screen such that bi-directional communications may occur with the device utilizing the capacitive touch screen. For example, a card may receive information via light pulses emitted from the capacitive touch display. More particularly, for example, a software program may be installed in a device (e.g., a mobile telephone) operable to emit messages, via light, to a card and receive messages, via touch, from the card. The bi-directional communication may happen in parallel (e.g., light pulses may be sent to the card simultaneously with touch pulses being received from the card). The bi-directional communications may happen sequentially (e.g., the card may communicate via touch and then, after the card communicates, the card may receive communication from the device via light and, after the device communicates, the card may communicate via touch). The device may communicate identification and password information via light pulses to a battery-powered card (or other device) such that the battery-powered device may securely identify the communicating device. In this manner, the devices may initiate a handshake in order to identify each other and initiate a secure communications channel between the two devices. At least one of the devices may communicate with a remote server (e.g., via a telephonic communications channel) to receive information about the device communicating with it such that received identification and password information may be identified by the remote server. The identification and password information for multiple devices may be, for example, stored locally on any one of the devices.

Bi-directional communication may, for example, allow for handshaking to occur between the two devices such that each device may be identified and setup a secure communication channel via light pulses and touch pulses. Additionally, for example, information indicative of receipt of message may be communicated via light and/or touch. Information may be communicated in other ways such as, for example, via sound or electromagnetic pulses. Synchronization signals may be communicated before and after a message. For example, a string of particular bits (e.g., "0"s) may appear before every message in order for a card, or other device, to lock onto the timing of the information being transmitted in the signal. For example, a zero may be transmitted via a "short" touch pulse and a one may be transmitted via a "long" touch pulse. In synchronizing the signal, the receiving device may train itself onto the duration of a "short" touch pulse versus a "long" touch pulse. A "short" touch pulse may be the time between activations of a capacitive sensor or the time between the activation and deactivation of a touch sensor.

A card may include one or more light sensors, touch transmitters, capacitive touch sensors, and/or light emitters. Accordingly, two instances of such a card may communicate bi-directionally via light as well as via capacitive touch.

A webpage, or other graphical user interface, may be displayed on a device (e.g., a mobile telephonic phone) and may interact with a card, both via communicating light information and receiving touch information, and this information may be communicated to a remote server. Such a remote server may be, for example, an authentication server utilized to complete a purchase or other transaction. In this manner, a user does not need, for example, to load his/her payment information into a website. Instead, for example, a user may gather a variety of items for purchase and may select to pay with a touch-communicating card. At this moment, the user may hold the card to the display of a device (e.g., a mobile telephonic phone or portable computer) and the payment information may be securely communicated, via the webserver, to a remote server for payment authorization.

A touch transmitter on a card may be, for example, mechanical or electronic in nature. For example, a mechanical switch may physically connect a conductive material having a particular capacitance to another conductive material having a different particular capacitance. In doing so, for example, the mechanical switch may determine whether a conductive area has a capacitance approximately that of a finger in order to communicate information to a capacitive touch screen. As per another example, a circuit may be provided that electrically provides a particular capacitance on a plate (e.g., a particular electrostatic field having a particular capacitance). In doing so, a microprocessor may electronically trigger one or more capacitive touch sensors on a capacitive touch screen of a device (e.g., a mobile telephonic device).

BRIEF DESCRIPTION OF THE DRAWINGS

The principles and advantages of the present invention can be more clearly understood from the following detailed description considered in conjunction with the following drawings, in which the same reference numerals denote the same structural elements throughout, and in which.

DETAILED DESCRIPTION OF THE INVENTION

Figure 1:
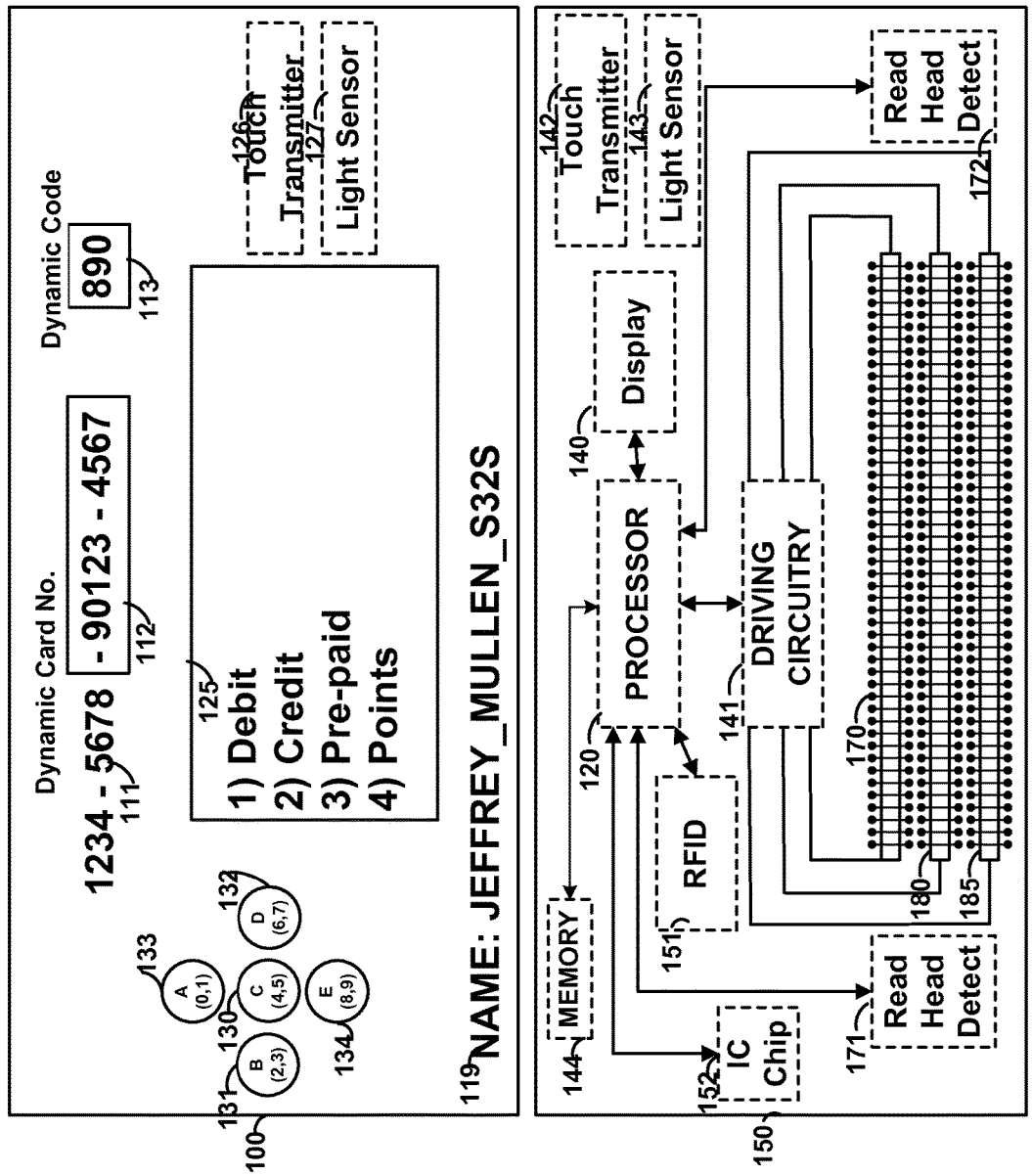
FIG. 1 is an illustration of cards constructed in accordance with the principles of the present invention.

FIG. 1 shows card 100 that may include, for example, a dynamic number that may be entirely, or partially, displayed via display 112. A dynamic number may include a permanent portion such as, for example, permanent portion 111. Permanent portion 111 may be printed as well as embossed or laser etched on card 100. Multiple displays may be provided on a card. For example, display 113 may be utilized to display a dynamic code such as a dynamic security code. Display 125 may also be provided to display logos, barcodes, as well as multiple lines of information. A display may be a bi-stable display or non bi-stable display. Permanent information 119 may also be included and may include information such as information specific to a user (e.g., a user's name or username) or information specific to a card (e.g., a card issue date and/or a card expiration date). Card 100 may include one or more buttons such as buttons 130-134. Such buttons may be mechanical buttons, capacitive buttons, or a combination or mechanical and capacitive buttons. A button (e.g., button 130) may be used, for example, to communicate information through a dynamic magnetic stripe communications device indicative of a user's desire to communicate a single track of magnetic stripe information. Persons skilled in the art will appreciate that pressing a button (e.g., button 130) may cause information to be communicated through a dynamic magnetic stripe communications device when an associated read-head detector detects the presence of a read-head of a magnetic stripe reader. Button 130 may be utilized to communicate (e.g., after button 130 is pressed and after a read-head detects a read-head of a reader) information indicative of a user selection (e.g., to communicate two tracks of magnetic stripe data). Multiple buttons may be provided on a card and each button may be associated with a different user selection. Card 100 may include, for example, touch transmitter 126 and light sensor 127.

Architecture 150 may be utilized with any card. Architecture 150 may include processor 120. Processor 120 may have on-board memory for storing information (e.g., drive code). Any number of components may communicate to processor 120 and/or receive communications from processor 120. For example, one or more displays (e.g., display 140) may be coupled to processor 120. Persons skilled in the art will appreciate that components may be placed between particular components and processor 120. For example, a display driver circuit may be coupled between display 140 and processor 120. Memory 144 may be coupled to processor 120. Memory 144 may include data that is unique to a particular card. For example, memory 144 may store discretionary data codes associated with buttons of a card (e.g., card 100 of FIG. 1). Such codes may be recognized by remote servers to effect particular actions. For example, a code may be stored in memory 144 that causes a promotion to be implemented by a remote server (e.g., a remote server coupled to a card issuer's website). Memory 144 may store types of promotions that a user may have downloaded to the device and selected on the device for use. Each promotion may be associated with a button. Or, for example, a user may scroll through a list of promotions on a display on the front of the card (e.g., using buttons to scroll through the list). A user may select the type of payment on card 100 via manual input interfaces corresponding to displayed options on display 125. Selected information may be communicated to a magnetic stripe reader via a dynamic magnetic stripe communications device. Selected information may also be communicated to a device (e.g., a mobile telephonic device) having a capacitive sensor or other type of touch sensitive sensor.

Card 100 may include, for example, any number of touch transmitters 126 or light sensors 127. Touch transmitters 126 may be utilized, for example, to activate and deactivate a touch sensor on a capacitive, or other, touch screen. In doing so, a device having a touch screen may believe that a user is physically providing physical instructions to the device when a card is actually providing physical instructions to the device. Light sensors 127 may be utilized such that a display screen, or other light emitting device, may communicate information to light sensors 127 via light.

Any number of reader communication devices may be included in architecture 150. For example, IC chip 152 may be included to communicate information to an IC chip reader. IC chip 152 may be, for example, an EMV chip. As per another example, RFID 151 may be included to communicate information to an RFID reader. A magnetic stripe communications device may also be included to communicate information to a magnetic stripe reader. Such a magnetic stripe communications device may provide electromagnetic signals to a magnetic stripe reader. Different electromagnetic signals may be communicated to a magnetic stripe reader to provide different tracks of data. For example, electromagnetic field generators 170, 180, and 185 may be included to communicate separate tracks of information to a magnetic stripe reader. Such electromagnetic field generators may include a coil wrapped around one or more materials (e.g., a soft-magnetic material and a non-magnetic material). Each electromagnetic field generator may communicate information serially to a receiver of a magnetic stripe reader for a particular magnetic stripe track. Read-head detectors 171 and 172 may be utilized to sense the presence of a magnetic stripe reader (e.g., a read-head housing of a magnetic stripe reader). This sensed information may be communicated to processor 120 to cause processor 120 to communicate information serially from electromagnetic generators 170, 180, and 185 to magnetic stripe track receivers in a read-head housing of a magnetic stripe reader. Accordingly, a magnetic stripe communications device may change the information communicated to a magnetic stripe reader at any time. Processor 120 may, for example, communicate user-specific and card-specific information through RFID 151, IC chip 152, and electromagnetic generators 170, 180, and 185 to card readers coupled to remote information processing servers (e.g., purchase authorization servers). Driving circuitry 141 may be utilized by processor 120, for example, to control electromagnetic generators 170, 180, and 185.

Architecture 150 may also include, for example, touch transmitter 142 as well as light sensor 143. Architecture 150 may communicate information from touch transmitter 142 as well as receive information from light sensor 143. Processor 120 may communicate information through touch transmitter 142 and determine information received by light sensor 143. Processor 120 may store information on memory 144 to later be, for example, communicated via touch transmitter 142.

Figure 2:
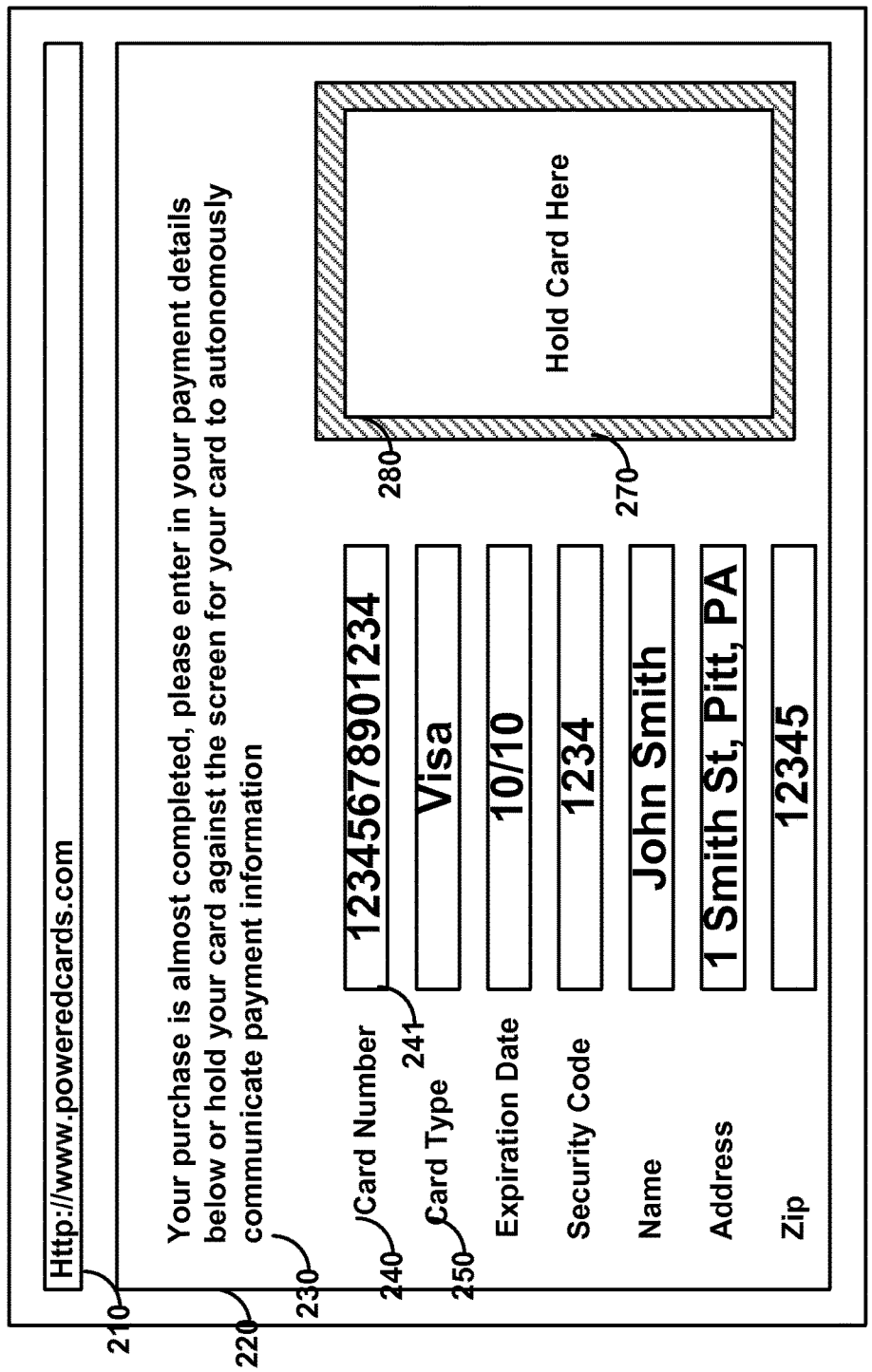
FIG. 2 is an illustration of a graphical user interface constructed in accordance with the principles of the present invention.

FIG. 2 shows graphical user interface (GUI) 200 that may be displayed, for example, from a stationary or portable computer, a mobile telephonic phone, a tablet computer, a navigational system, a watch, a card, or any device having a display screen. Graphical user interface 200 may be hosted, for example, from a server and may communicate with a number of additional servers. For example, graphical user interface 200 may be provided on a web browser, or other application run from a device, to complete a purchase transaction. GUI 200 may include, for example, input text boxes for a user to enter a card number, card type, expiration date, security code, name, address, and zip code. A submit button (not shown) may be included, for example, to communicate this information to a remote server for authorization. Additional text boxes may be included, for example, such as a text box for additional discretionary payment data or a shipping address.

GUI 200 may also have communication area 280 surrounded by status area 270. Communication area 280 may be utilized, for example, to communicate data to/from a card or other device via light output and tactile input. Status area 270 may be utilized to communicate to a user of the status of the communication.

Accordingly, for example, GUI 200 may receive payment information from a card via a touch sensor located on a display providing GUI 200. GUI 200 may communicate information to a card via light (e.g., light pulses). Accordingly, for example, a secure communication may occur between a card and GUI 200. The information may be displayed in the text boxes (e.g., the text boxes may be auto filled either completely or partially). Alternatively, for example, no information may be shown. Status area 270 may, for example, provide a particular color of light (e.g., yellow) to indicate to the user that the process is underway. A different color of light may be displayed before the process begins (e.g., red). Yet a different color of light may be displayed after the process is completed (e.g., green).

The information may be communicated in encrypted form to GUI 200. GUI 200 may then, for example, decrypt the information or forward the encrypted message to a remote server for processing. In doing so, for example, GUI 200 may not be exposed to any unprotected sensitive information. Information communicated from the card to the GUI may include, for example, card number, card type, expiration date, security code, zip code, address, email address, shipping address, additional discretionary data, discretionary data indicative of user-selected payment codes, or any other type of information. A card may also, communicate, for example encryption keys as well as other data for device handshaking and secure communication protocols. A card may, for example, communicate an email address and a password via a touch transmitter generated by the card. In doing so, for example, a payment may be authorized based on an email address and a password. An amount may also be entered into a card, or other device, by a user and communicated to GUI 200 via touch-based communications from the card.

One or more light sensors or touch transmitters may be located on a card. For example, a touch transmitter may be located at opposite ends of a card. A user may touch a button (e.g., a download button) to start communicating data via the touch transmitter. The GUI may be able to determine whether, for example, one or more touch transmitters are located within communication area 280. If the card is not aligned, the user may be notified (e.g., by status area 270 performing a particular action, such as blinking or displaying particular text or color) until the card is properly aligned within communication area 280. Communication area 280 may communicate information, via light, back to the card, or other device, that the card is being realigned such that the card does not require a user to repress a particular button (e.g., a "download" button). In doing so, GUI 200 may communicate the status of the communication back to a card, or other device, held against communication area 280 via light.

Figure 3:
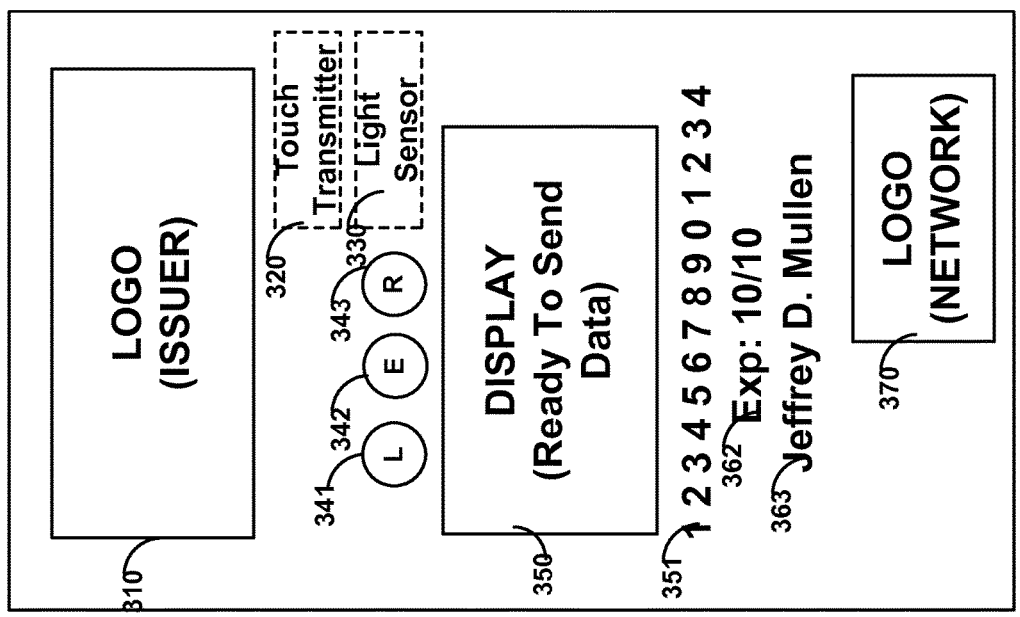
FIG. 3 is an illustration of a card constructed in accordance with the principles of the present invention.

FIG. 3 shows card 300, which may be provided in a vertical configuration. Card 300 may include, for example, issuer logo 310, network logo 370, display 350, manual input interfaces 341-343, touch transmitter 320, light sensor 330, permanent indicia 351, 362, and 363. Persons skilled in the art will appreciate that any permanent indicia may be provided via display 350. For example, one or more payment card numbers, user name, expiration date, and security codes may be provided via display 350. Persons skilled in the art will appreciate that touch transmitter 320 and/or light sensor 330 may be placed in the proximity of a corner of a card. By placing touch transmitter 320 in the proximity of a corner of a card, the corner of the card may be placed over a portion of a capacitive touch screen and communicate data without the need for the entire card to be placed over the capacitive touch screen. Display 350 may, for example, be utilized to display a payment card number such as a fifteen or sixteen digit credit or debit card number. Manual input interface 341 may, for example, allow a user to scroll in a particular direction (e.g., the left direction or the up direction) of a list of options. Manual input interface 343 may, for example, allow a user to scroll in a different direction (e.g., the right direction or the down direction) or a list of options. Manual input interface 342 may, for example, allow a user to select an option from a list of options.

Figure 4:
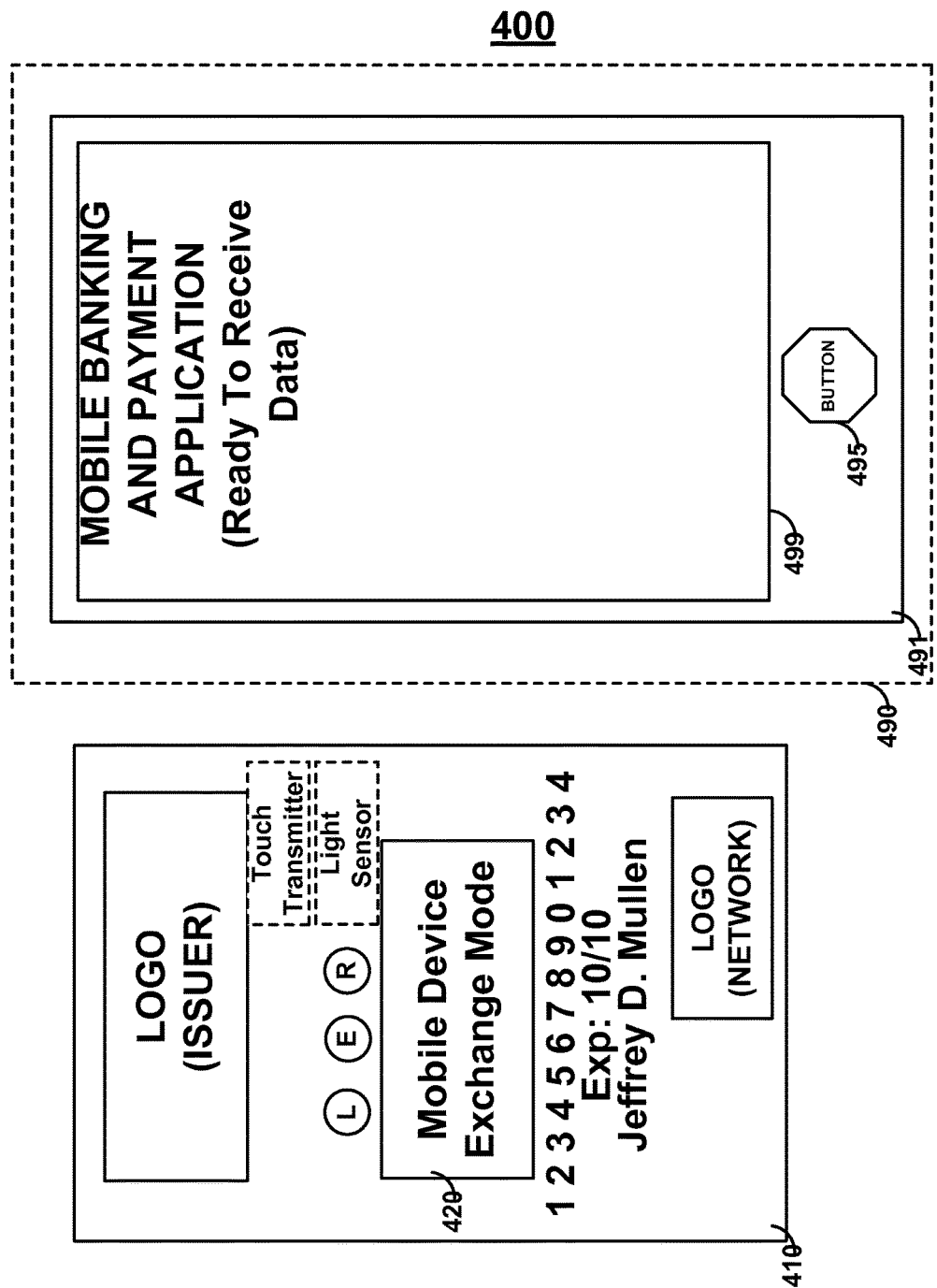
FIG. 4 is a schematic of a system constructed in accordance with the principles of the present invention.

FIG. 4 shows system 400 that may include mobile telephonic device 490 and device 410 (e.g., a payment card).

Device 410 may include, for example, display 420 that may display status indicative of a communication. A touch transmitter and/or light sensor may be provided on a surface of device 410 opposite display 420. In this manner, for example, device 410 may communicate with mobile telephonic device 490 as device 410 is held against device 490, but device 410 may communicate information indicative of the status of a communication via display 420.

Device 490 may include housing 491, button 495, and capacitive touch display screen 499. Device 410 may utilize a touch transmitter to, for example, communicate information to mobile telephonic device 490. Persons skilled in the art will appreciate that a mobile banking application may be utilized on mobile telephonic device 490. Device 410 may be utilized to properly identify a person securely in order to reduce fraud. Accordingly, device 410 may communicate identification information and security codes, such as time based or used based codes, to device 490 via display 499. Accordingly, such an identification may be required, for example, by a banking application in order to gain access to banking information, execute a financial trade (e.g., a stock or option trade), transfer money, or pay a bill via an electronic check.

Figure 5:
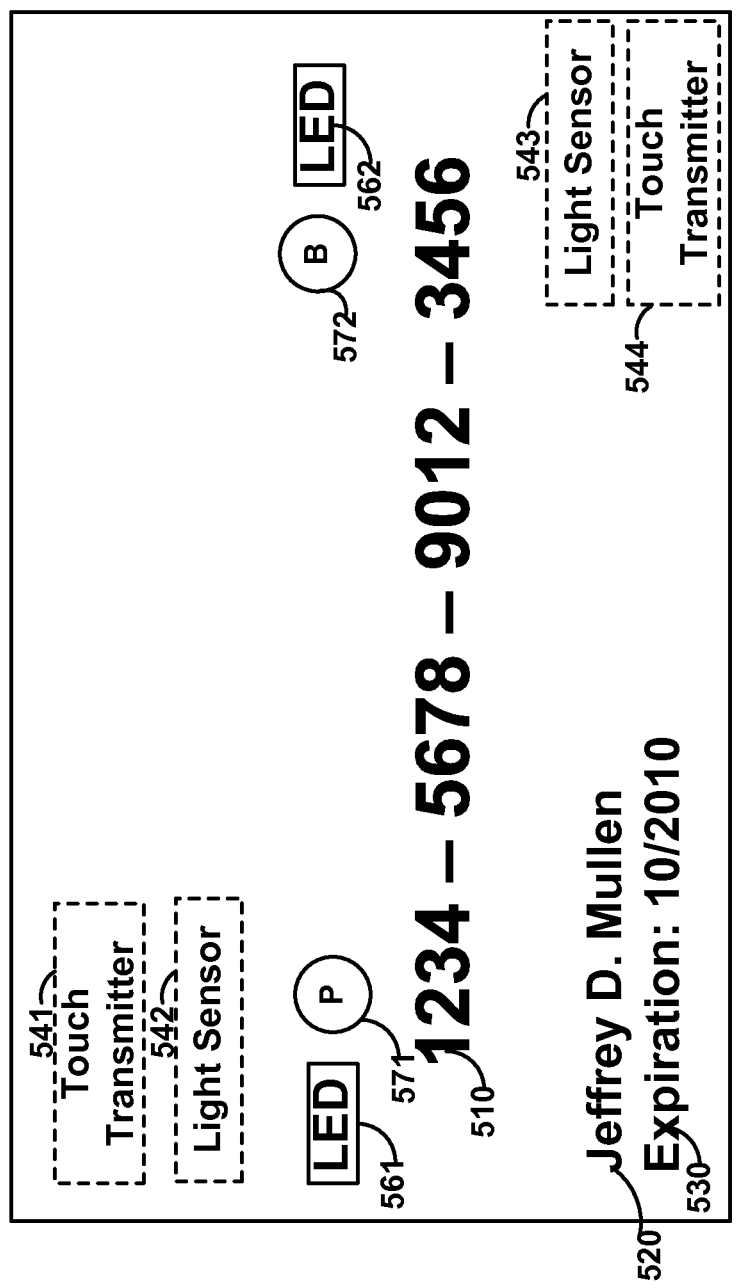
FIG. 5 is a schematic of a card constructed in accordance with the principles of the present invention.

FIG. 5 shows device 500 that may include, for example, touch transmitter 541, light sensor 542, light emitting diodes 561 and 562, buttons 571 and 572, permanent information 520 and 530, as well as light sensor 543 and touch transmitter 544.

Persons skilled in the art will appreciate that multiple touch transmitters may communicate data simultaneously in parallel to a touch screen. Similarly, for example, multiple light sensors may receive data simultaneously in parallel from a display screen. The information may be, for example, different or the same. By communicating the same information through different touch transmitters, a device may receive two messages and confirm receipt of a communication if the two messages are the same. Touch transmitters may be utilized, for example, by software on a device to determine the positioning of device 500 on an associated touch screen. Similarly, light sensors may be utilized, for example, to receive information indicative of the positioning of device 500 on an associated touch screen. The electronics of a card (e.g., a touch transmitter) may be provided on a single or multiple layer flexible printed circuit board and laminated via a hot-lamination or cold-lamination process. An injection process may be utilized where one or more liquids may be provided about an electronics package and hardened (e.g., via a light, temperature, pressure, and/or chemical process) to form a card. A card may be, for example, between approximately 30 and 33 thousandths of an inch thick.

Figure 6:
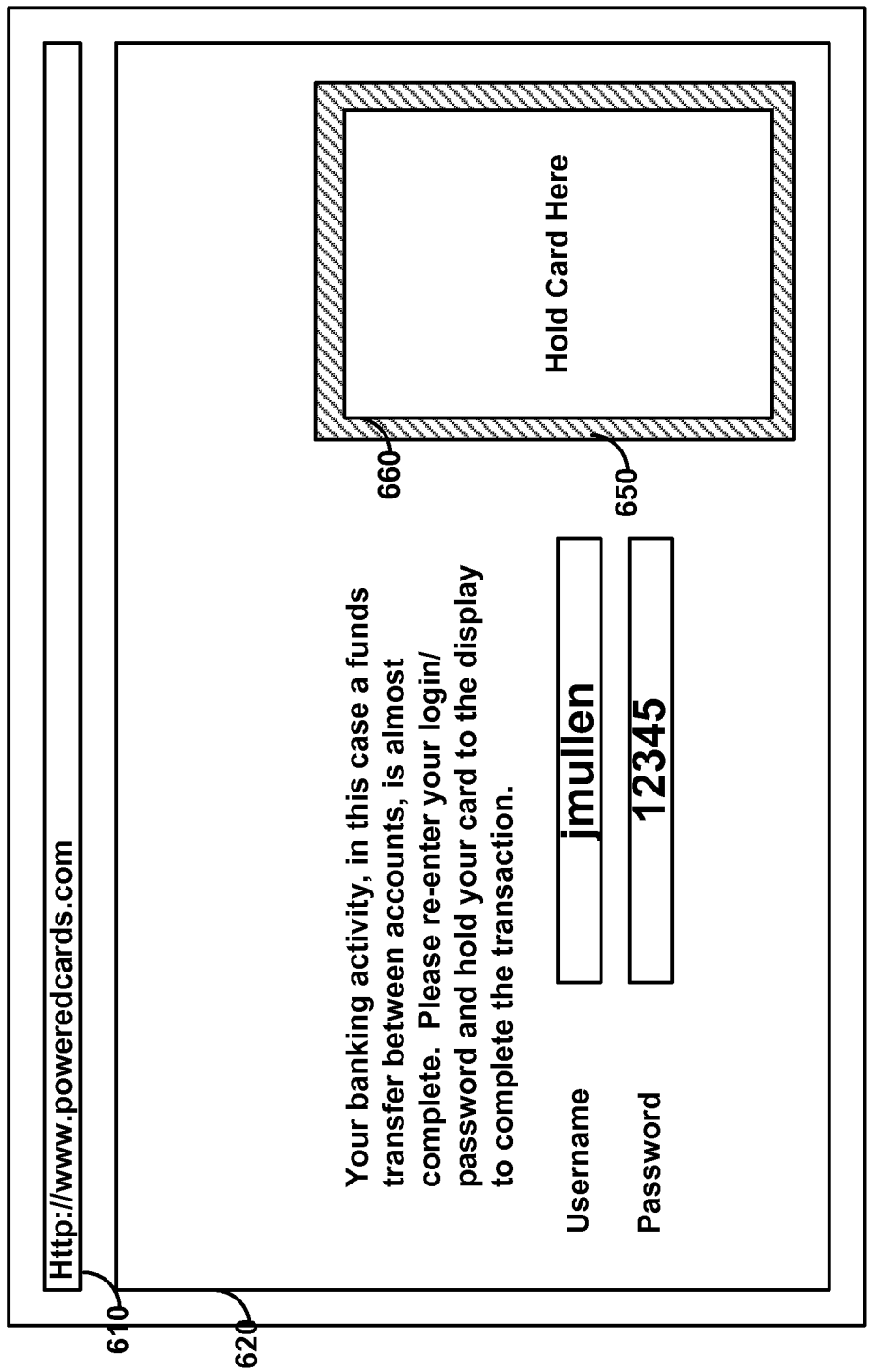
FIG. 6 is an illustration of a graphical user interface constructed in accordance with the principles of the present invention.

FIG. 6 shows GUI 600 that may include navigation bar 610 and main screen 620. GUI 600 may be, for example, a web browser for a mobile banking application. A user may be required to, for example, enter a username, password, and authenticate by holding a banking card to a display over area 660 such that the banking card may communicate an authentication message. In doing so, status area 650 may change to display indicia indicative of an authenticated identity. The card may also receive information, via light or other method (e.g., sound) as part of the authentication process. Upon authentication, the user may be provided access to the mobile banking application or a particular transaction may occur (e.g., a funds transfer may be initiated or a purchase transaction may be authorized). Such an authentication process may occur for any process, such as a process performed at least in part on an application or webpage of a device.

Figure 7:
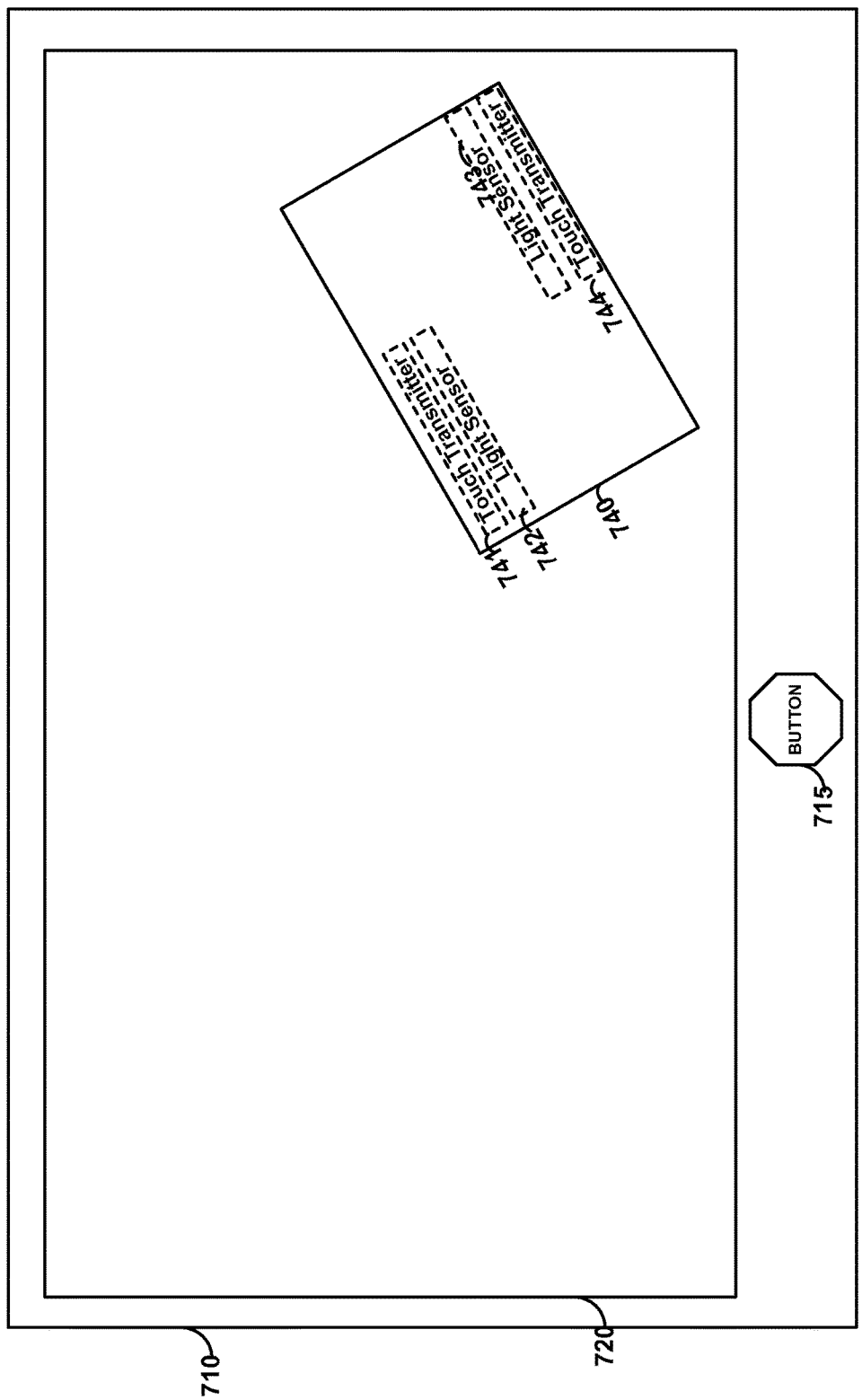
FIG. 7 is an illustration of a system constructed in accordance with the principles of the present invention.

FIG. 7 shows device 700 that may include housing 710 and touch display screen 720. A user may hold a card anywhere on touch display screen 720 and a software program running on device 700 may detect the orientation and position of card 740 on touch display screen 720 via touch pulses communicated via touch transmitters 741 and 744. Light sensors 742 and 743 may be utilized such that device 700 may communicate information back to card 740 via light. Device 700 may communicate light in the proximity of light sensors 742 and/or 743 by determining the location and orientation of card 740 on device 700. In doing so, for example, light pulses may be generated by device 700, but may be hidden from the view of a user via card 740. One or more buttons 715 may be provided on device 700. Button 715 may, for example, be utilized to turn a display of device 700 OFF and/or toggle display of device 700 between ON and OFF.

Figure 8:
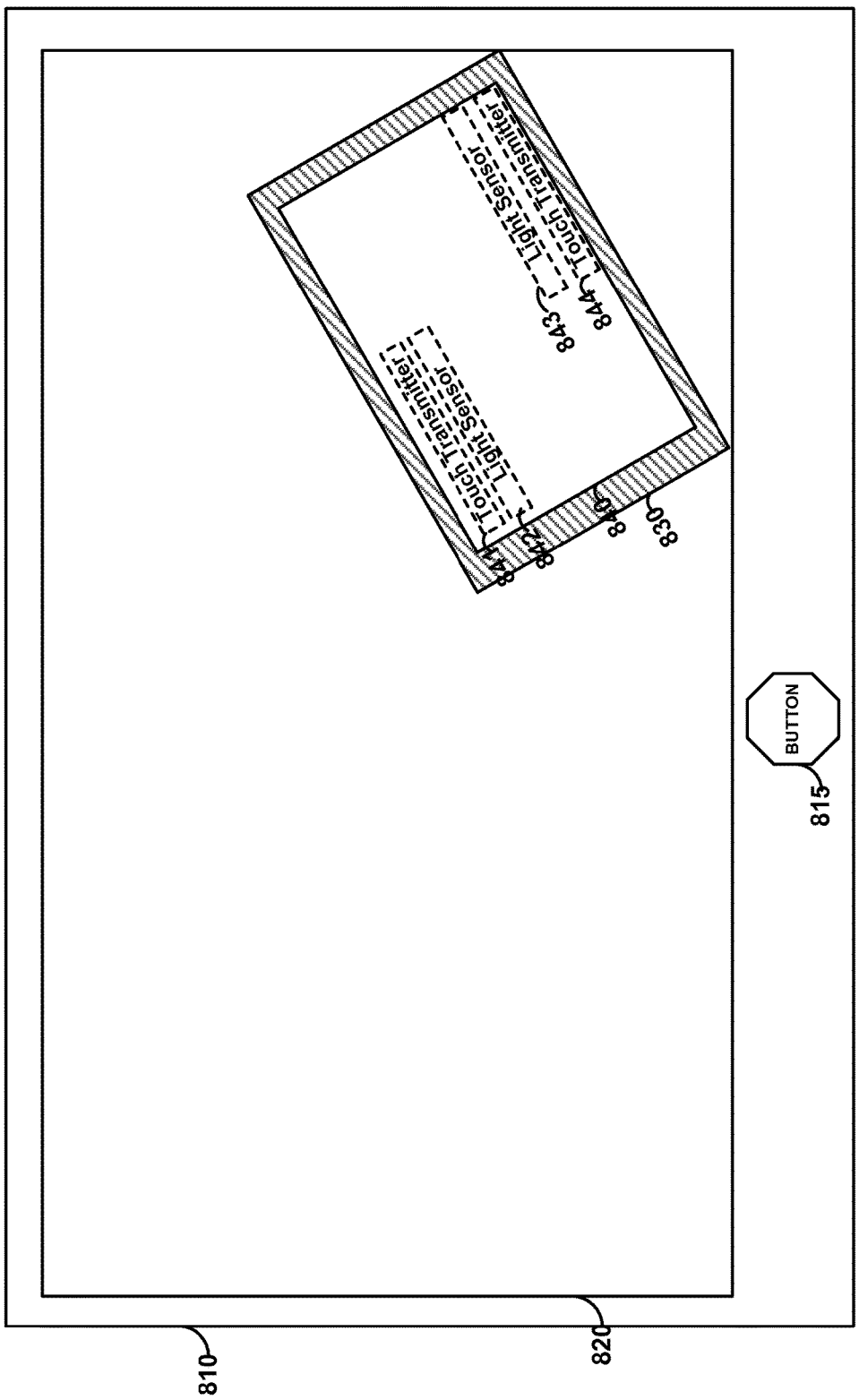
FIG. 8 is an illustration of a system constructed in accordance with the principles of the present invention.

FIG. 8 shows system 800 having device 810 with button 815 and touch sensitive display 820 and card 840 having touch transmitters 841 and 844 and light sensors 842 and 843. Software on device 810 may detect touch pulses from card 840 and may confirm the presence of card 840 by creating status area 830 around card 840 in the proximity of card 840 and in the approximate configuration of card 840. Status area 830 may form a frame around a card and, as such, may be longer and wider than a card. Status area 830 may be, for example, a box in which a card may be placed and, as such, may be longer and wider than a card. Indicia may be provided in status area 830 such as, for example, text information describing a status of a process (e.g., "orientation confirmed," "authorizing transaction," "transaction authorized, please remove card."). Status area 830 may, for example, change colors as the status of a process changes. For example, status area 830 may be a first color while a transaction is being authorized and a second color after a transaction is authorized.

Figure 9:
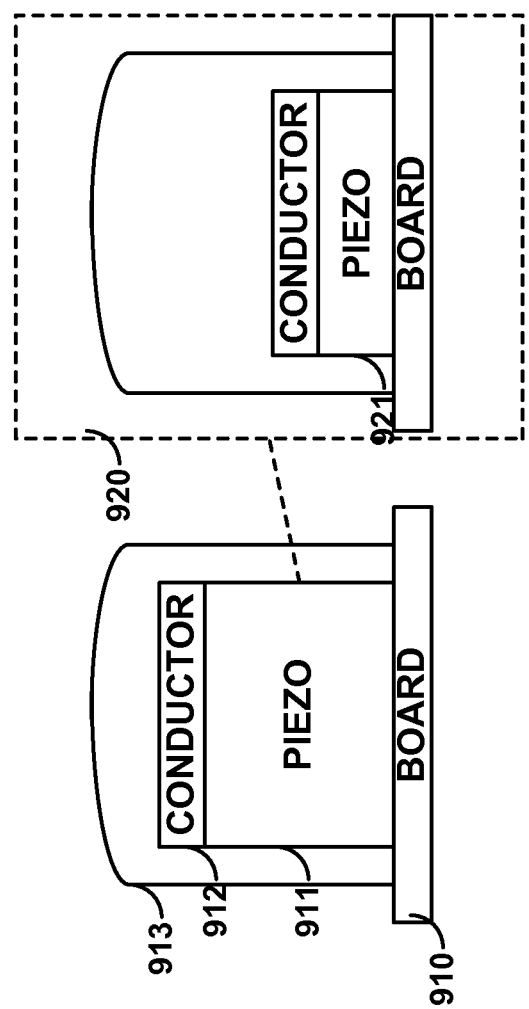
FIG. 9 is an illustration of a device constructed in accordance with the principles of the present invention.

FIG. 9 shows touch transmitter 900 that may include piezoelectric actuator 911, conductive layer 912, and dome 913. Piezoelectric actuator 911 may be coupled to board 910, which may be a single or multiple layer flexible printed circuit board. A processor may control the actuation state of piezoelectric actuator 911 in order to move conductive layer 912 closer to, or further away, from the surface of a device. In doing so, the processor may physically touch and untouch a touch screen in order to provide input to that touch screen. For example, piezoelectric actuator 911 may be retracted to position 921 as shown in state 920. Persons skilled in the art will appreciate that conductor 912 may have a capacitance approximate to the capacitance of a finger and that dome 913 may not be included such that conductor 912 may physically touch a touch sensitive display.

Figure 10:
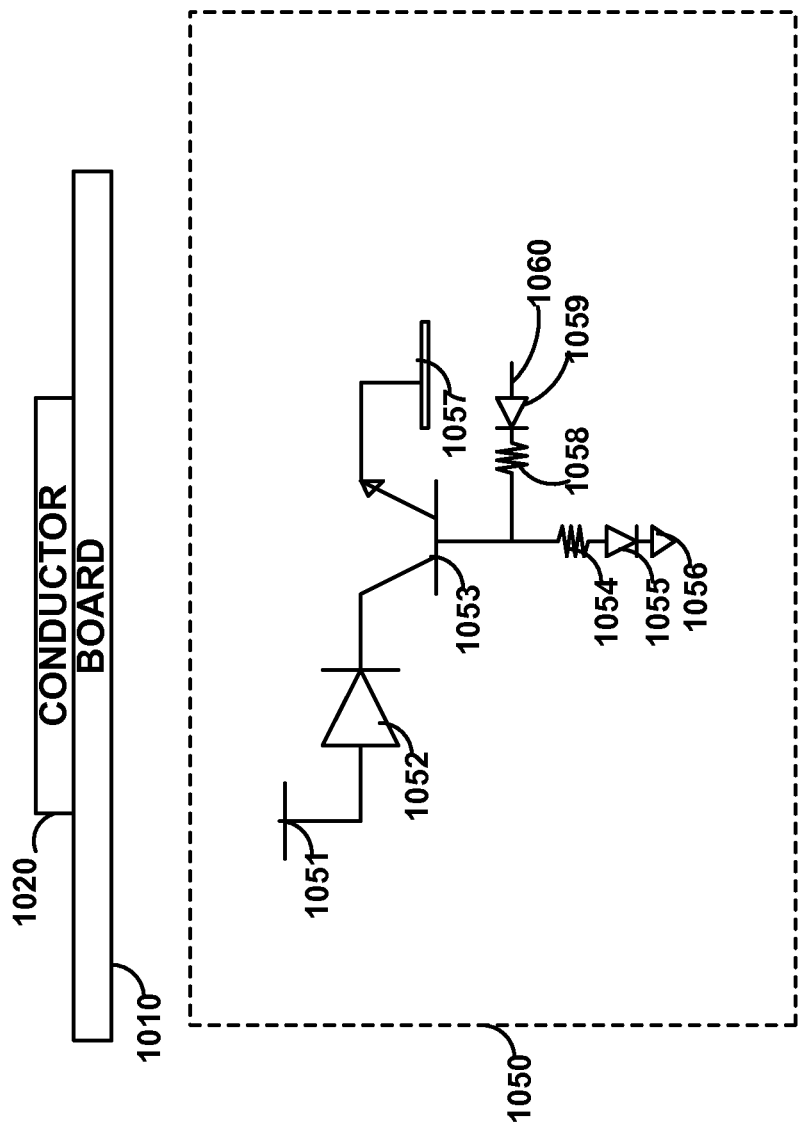
FIG. 10 is an illustration of a device constructed in accordance with the principles of the present invention.

FIG. 10 shows touch transmitter 1000 that may include, for example, board 1010 and conductive layer 1020. Persons skilled in the art will appreciate that board 1010 may be a single or multiple layer printed circuit board with printing on a single or both surfaces of each layer. Board 1010 may be a flexible circuit board reinforced with additional material (e.g., Kevlar). Board 1010 may be, for example, a single or multiple layer flexible printed circuit board. Components may be fixed to board 1010 using, for example, a wire-bonding, flip-on-flex, or another assembly process. Conductor 1020 may be, for example, an area of copper provided on the surface of board 1010. Accordingly, conductor 1020 may be printed on the surface of board 1010 such that, for example, additional assembly efforts are not required and the cost of touch transmitter 1000 is decreased. A processor (not shown) may provide control signals to a mechanical switch (not shown) in order to physically connect additional conductive material, or other components, to conductor 1020. In doing so, the processor may physically change the amount of capacitance seen at conductor 1020 by a capacitive touch screen. Accordingly, a processor may send information signals to the capacitive touch screen by mechanically and/or electrically coupling and decoupling capacitance to conductor 1020 based on a particular encoding policy (e.g., F2F encoding).

Touch transmitter 1000 may include circuitry 1050 that may, for example, electrically change the capacitance of conductor 1020 on board 1010. Circuitry 1050 may include, for example, supply voltage 1051, diode 1052, transistor 1053, conductor 1057 (e.g., which may be conductor 1020), resistor 1054, resistor 1058, diode 1059, diode 1055, ground 1056, and input terminal 1060. A processor (not shown) may be coupled to terminal 1060. Accordingly, a processor may electrically control a touch transmitter such that the touch transmitter may electrically touch a capacitive touch screen without mechanically touching the capacitive touch screen.

A capacitive touch screen is provided and may be fabricated to include, for example, a set of conductors that interact with electric fields. A human finger may include a number of conductive electrolytes covered by a layer of skin (e.g., a lossy dielectric). A finger's capacitance may vary, for example, between approximately 50 pF and 250 pF. A finger's capacitance may be referred to as Cf while the capacitance of a set of one or more touch sensors without a finger present may be referred to as Cp or parasitic capacitance.

A rectangular, square, circular, oval, or any shaped plate may be provided. For example, plate 1057 may be provided. The plate may be fabricated from a conductive material such as, for example, copper. The area of the plate may be, for example, constructed to be smaller than the area of a touch sensor on a touch screen or a particular set of touch sensors on a touch screen. Plate 1057 may initially be provided with an initial capacitance of approximately zero or close to zero (e.g., 5 pF or less). Transistor 1053 may be coupled to plate 1057. Transistor 1053 may be, for example, an NPN transistor. The capacitance of transistor 1053 from collector to emitter, $C_{CE}$, may be approximately 5 pF or less. Initially, transistor 1053 may be OFF. Plate 1057 may be connected, for example, to the emitter of transistor 1053 and positioned to within the proximity of the touch sensor, or array of touch sensors, to be touched. The capacitance of plate 1057 may be, while transistor 1053 is OFF, low enough so plate 1057 does not activate any touch sensor. Persons skilled in the art will appreciate that a plate of a touch transmitter need not physically touch a touch sensor. Instead, for example, the plate of a touch transmitter may be located within the proximity of the touch sensor (e.g., separated from the touch sensor by a particular amount). For example, the plate may be approximately 5 to 30 thousandths of an inch from a touch sensor (e.g., approximately 12-16 thousandths of an inch). Transistor resistor 1058 and diode 1059 may be provided to, for example, isolate the capacitance of the rest of a card, or other device, circuitry from transistor 1053 while transistor 1053 is OFF. Additionally, transistor 1053 may be isolated from any other parasitic capacitance (e.g., supply voltages and ground terminals). Similarly, traces may be provided that are minimized in length in order to decrease parasitic capacitances around transistor 1053 and plate 1057.

A processor may apply a voltage across diode 1059 and resistor 1058 to turn transistor 1053 ON. Resistor 1058 may, for example, include a resistance of approximately 0.5 k-1.5 k (e.g., approximately 1 k).

The base of transistor 1053 may also be grounded to ground 1056 via diode 1055 and resistor 1054. Resistor 1054 may, for example, include a resistance of approximately 7.5 k-12.5K (e.g., approximately 10 k).

The collector and base of transistor 1053 may be isolated, for example, by forward biased signal diodes. For example, diode 1052 may be provided between supply voltage 1051 and transistor 1053. Diodes may be utilized to block capacitance and may be either forward or reversed biased. In isolating capacitance from transistor 1053, the capacitance of plate 1057 may be more accurately controlled.

Persons skilled in the art will appreciate that diode 1059 may be provided to the left of resistor 1058. Persons skilled in the art will also appreciate that circuitry 1050 may be provided without resistor 1054 and diode 1055 if the source control has low impedance when inactive. Components may be added to, removed from, or modified within circuitry 1050. For example, the emitter of transistor 1053 may be grounded through a diode (or other circuit component) so that a current path may exist through transistor 1053 when transistor 1053 is ON.

Figure 11:
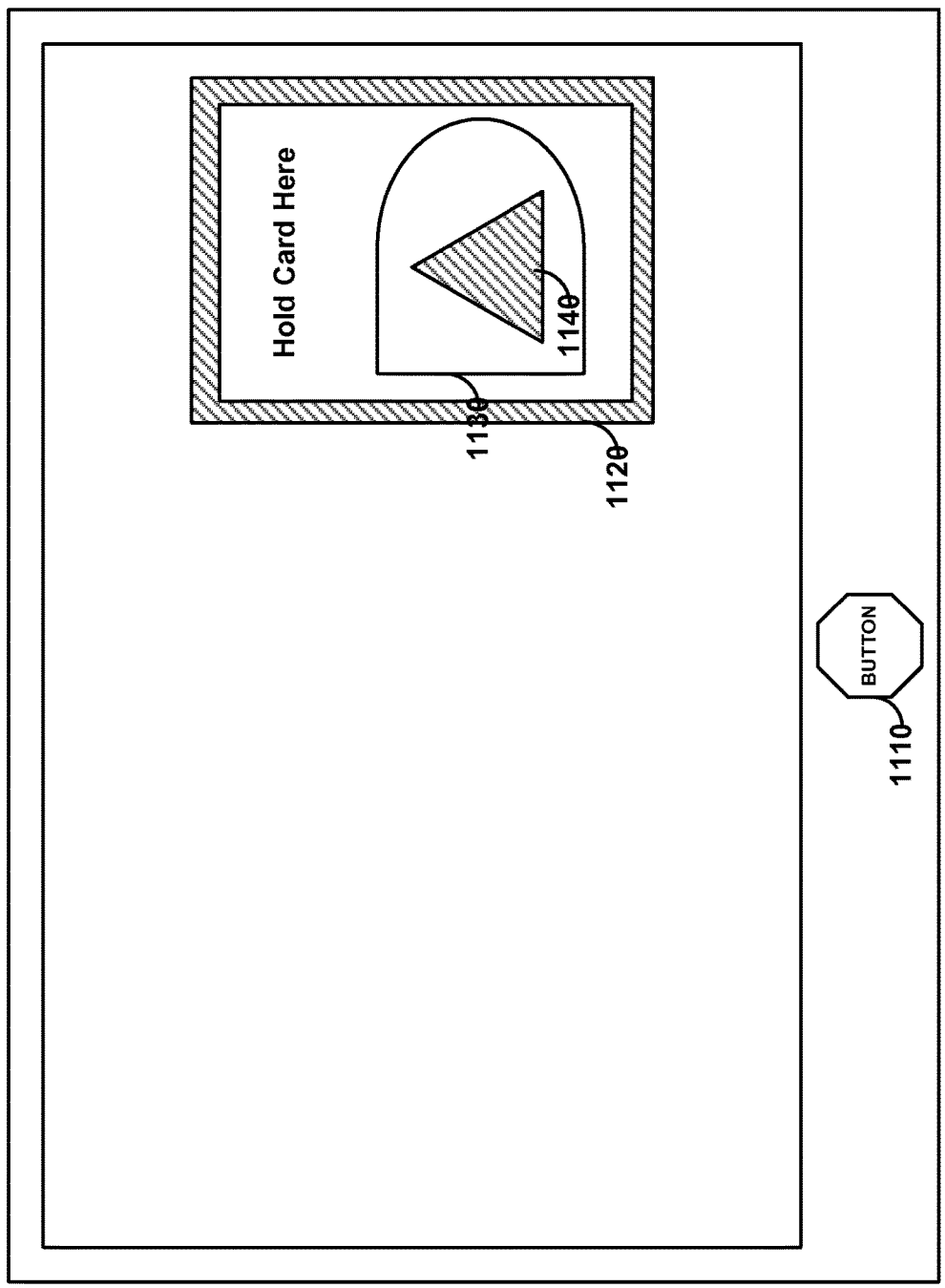
FIG. 11 is an illustration of a device constructed in accordance with the principles of the present invention.

FIG. 11 shows device 1100 that may be a touch sensitive display screen with a GUI having status area 1120, logo 1130, and light communication area 1140. Light communication area 1140 may provide light signals to a card in order to communicate information to the card. In turn, the area inside status area 1120 may be utilized to receive touch signals from the card. Persons skilled in the art will appreciate that the same area (e.g., area 1140) may be utilized to communicate both light and touch signals or different areas may be utilized to communicate light and touch signals. For example, area 1140 may be utilized to communicate light signals while the rest of logo 1130 may be utilized to communicate touch signals. Button 1110 may be included on device 1100 and may be a mechanical button.

Figure 12:
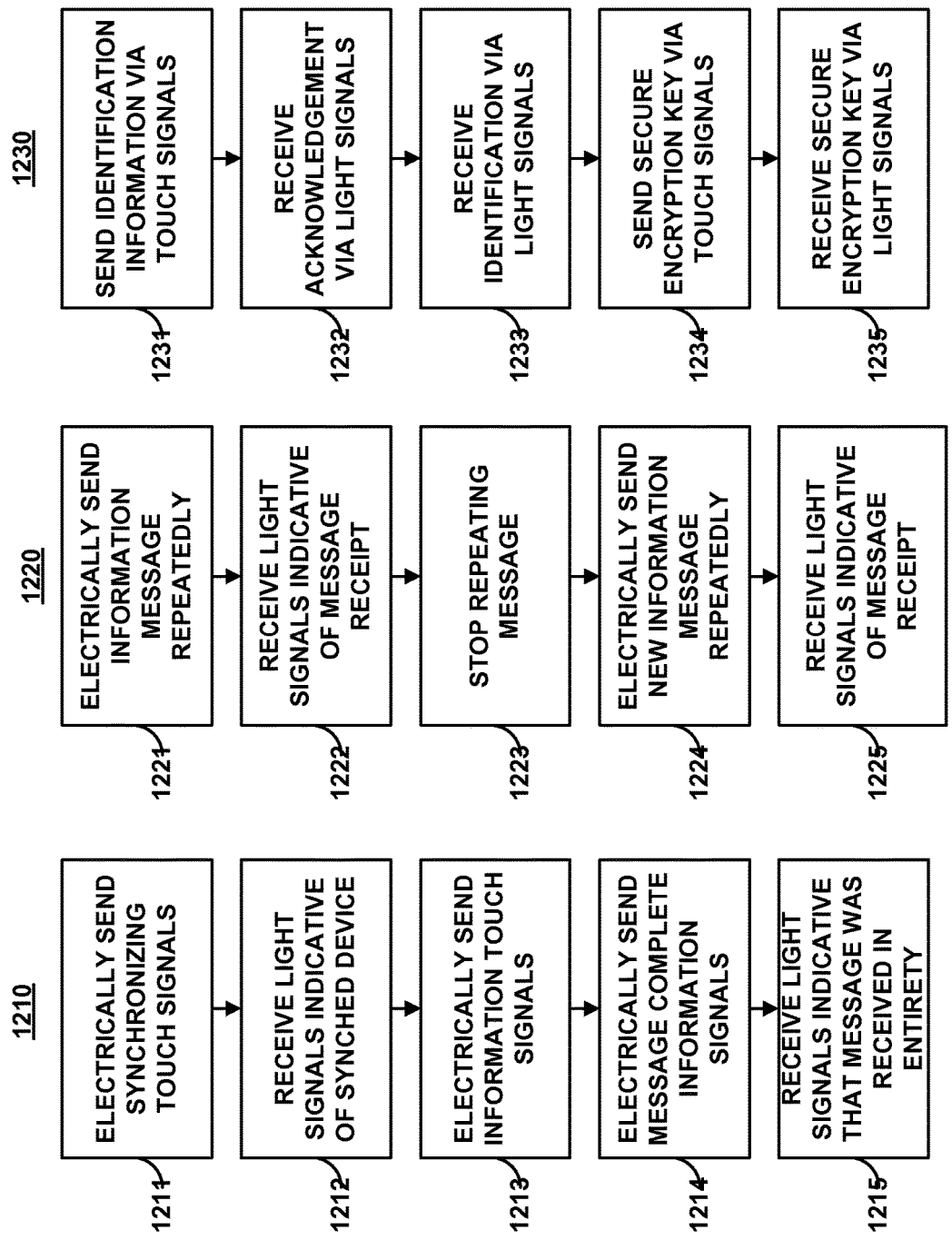
FIG. 12 is an illustration of flow charts constructed in accordance with the principles of the present invention.

FIG. 12 shows process flow charts 1210, 1220, and 1230. Process 1210 may include step 1211, in which a card, or other device, may send synchronizing touch signals to another card, or other device. The synchronization signals may include, for example, a string of a particular bit of information such as a string of "1"s or a string of "0"s. The card may receive, in step 1212, light signals (or other signals such as touch signals) indicative of the device receiving the synchronization signals and processing the synchronization signals so that the device is synchronized to receive information signals. In step 1213, the card may send information touch signals. In step 1214, the card may send touch signals indicative of the completion of a message. In step 1215, the card may receive signals (e.g., light signals) indicative of a message being received in its entirety. If a device does not receive the message properly (e.g., the data was corrupted), the device may request, via a light or touch signal, that the message be resent. The device receiving the touch signals may then, for example, communicate information back to the card in a similar manner. In step 1212, the return light signals may be, for example, light synchronization signals such that the card may synchronize to the expected light pulses that are to be received.

Process 1220 may include, for example, step 1221, in which an information message is repeatedly sent (e.g., via touch signals, light signals, or sound signals) from one device (e.g., a card) to another device (e.g., a mobile telephonic device). Step 1222 may occur in which a message is received indicative of a successful receipt of the message provided in step 1221. Accordingly, the message of 1221 may stop being sent in step 1223 and a new message may be sent repeatedly in step 1224 until the message is acknowledged as being received in step 1225.

Process 1230 may be provided and may include step 1231, in which identification information is communicated. Step 1232 may include receiving acknowledgment of receipt of identification information. Step 1233 may include receiving identification information from the other device. Step 1234 and 1235 may be utilized, for example, to exchange information regarding how future data in the communication may be encrypted.

Figure 13:
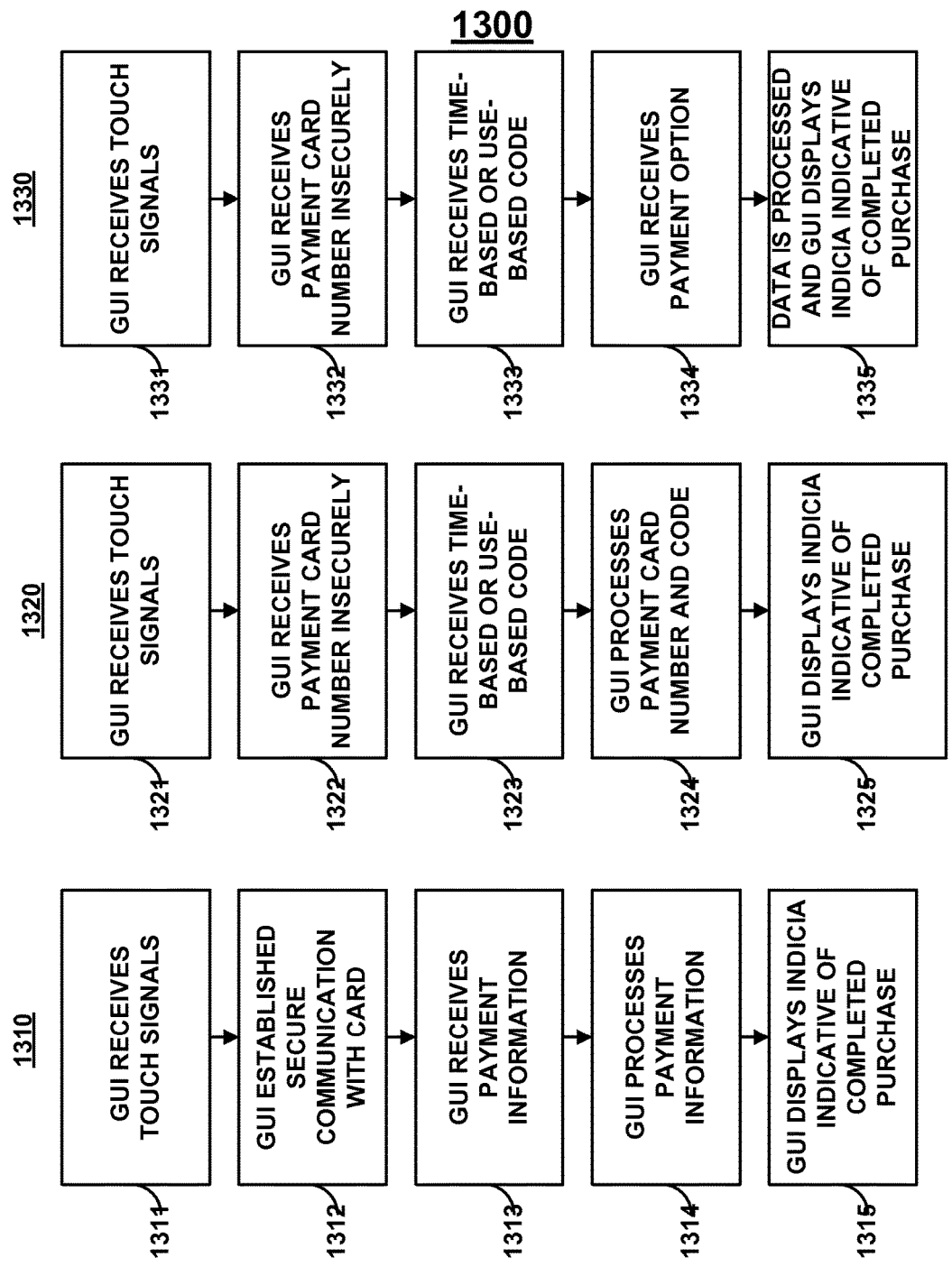
FIG. 13 is an illustration of flow charts constructed in accordance with the principles of the present invention.

FIG. 13 shows process flow charts 1310, 1320, and 1330. Flow chart 1310 includes step 1311, in which a GUI (e.g., running on a mobile phone or a portable computer) receives touch signals from a device such as a card. The GUI may establish secure communications in step 1312 and may receive payment information in step 1313. The GUI may process the payment information in step 1314 (e.g., via sending the data to a remote authorization server) and display indicia of a completed purchase in step 1315.

Process 1320 may be provided and may include step 1321, in which a GUI receives touch signals. Step 1322 may be included in which the GUI receives one or more payment card numbers. This communication may be, for example, an insecure communication. The GUI may receive a time-based or use-based code and may process the card number with this code in step 1324. Persons skilled in the art will appreciate that additional information may be utilized to process a purchase such as, for example, an expiration date and/or a zip code. Step 1325 may be included in which the GUI displays indicia representative of the completed purchase.

Process 1330 may be provided and may include step 1331, in which a GUI may receive touch signals. The GUI may receive a payment card number in step 1332, a time-based or use-based code in step 1333, and a payment option in step 1334. For example, a payment option may be to pay for a purchase using points instead of the user's credit line. As per another example, a payment option may be to pay for a purchase in a particular number of installments. Data may be processed and the GUI may display indicia indicative of a completed purchase in step 1335. Persons skilled in the art will appreciate that a completed purchase may include the display of an electronic receipt and information may be communicated to the card (e.g., via light) so the card may include an updated credit balance, point balance, or any other information update.

Figure 14:
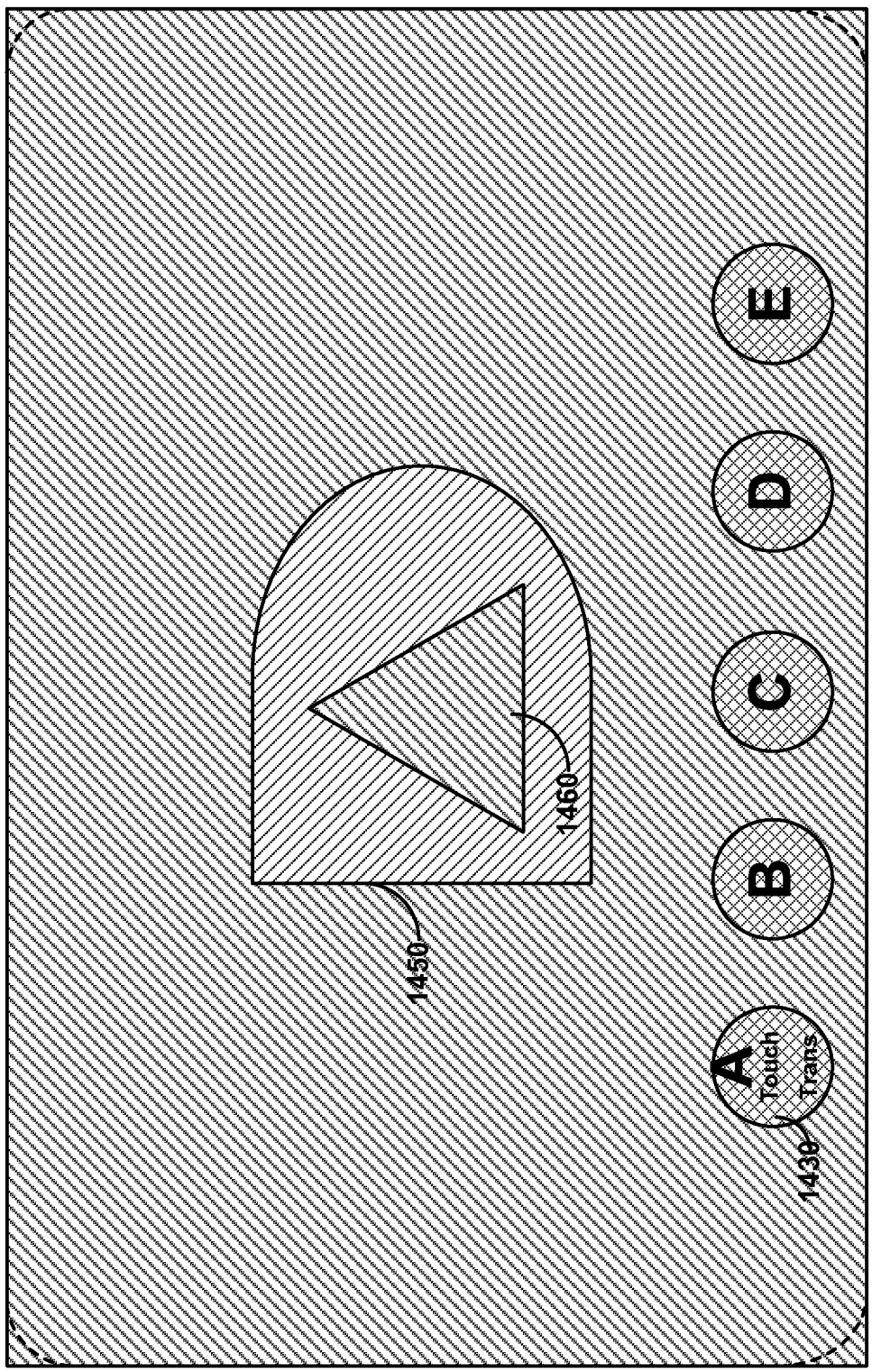
FIG. 14 is an illustration of a card constructed in accordance with the principles of the present invention.

FIG. 14 shows card 1400 that may include a display located substantially over one or both sides of the card. Indicia 1450 may be displayed and may include light communication area 1460. Card 1400 may include capacitive touch buttons such as capacitive touch button 1430. Capacitive touch button 1430 may also be controlled, for example, to activate a capacitive touch sensor on another card or device. Similarly, for example, a touch screen of a mobile phone may be provided and operated, for example, to electronically touch a capacitive touch screen of a different mobile phone (or card).

Figure 15:
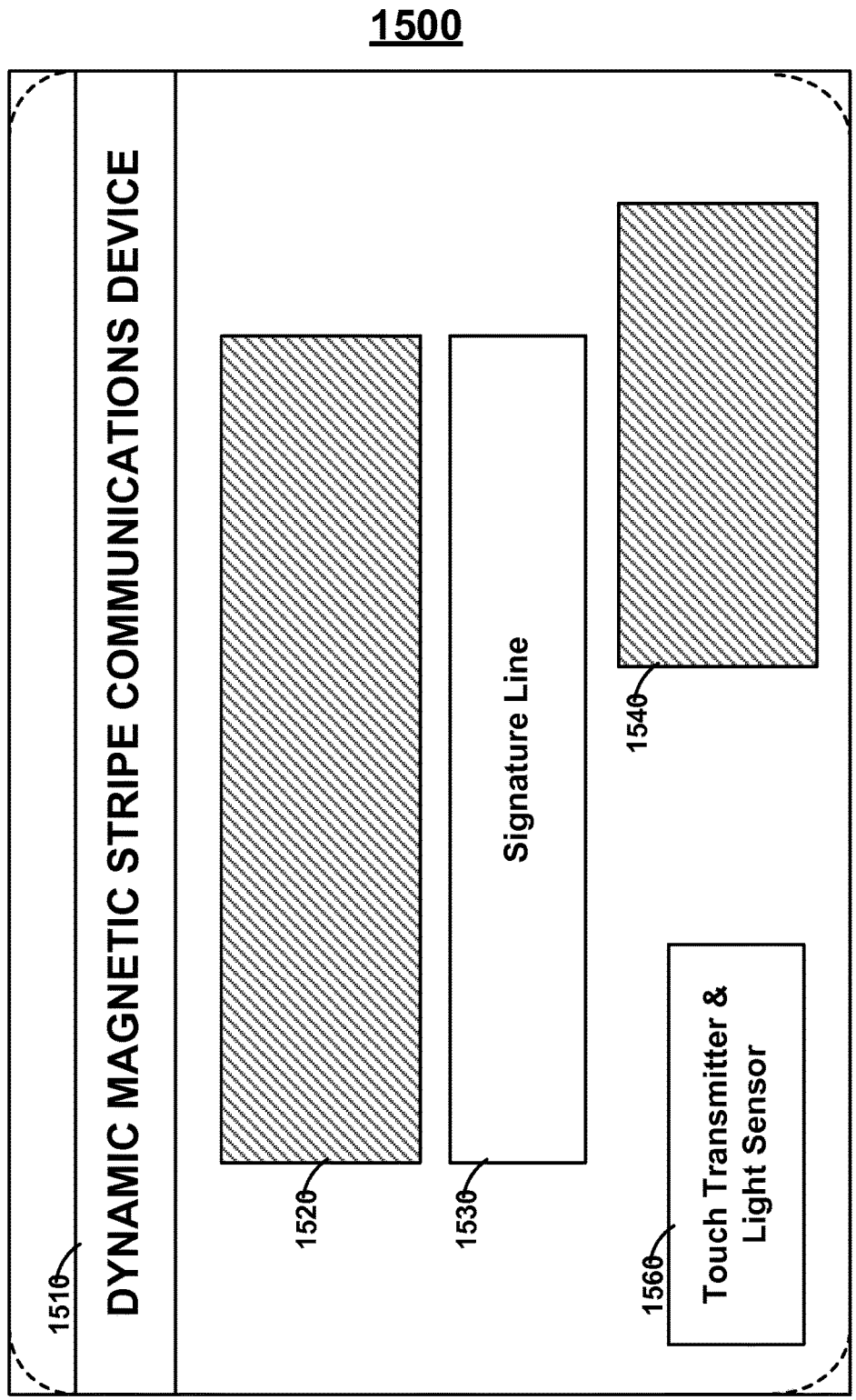
FIG. 15 is an illustration of a card constructed in accordance with the principles of the present invention.

FIG. 15 shows card 1500 that may include a side with signature line 1530, displays 1520 and 1540, dynamic magnetic stripe communications device 1510, and touch transmitter and light sensor 1560. Persons skilled in the art will appreciate that a touch transmitter and light sensor may be directed to receive and communicate information from a reverse side of a card such that a user may hold a card to a display and press a button on the card to initiate transfer. The card may include a source of light (e.g., LED) on the obverse side of the card to indicate when communication to a display via touch has begun, is underway, and has completed.

Figure 16:
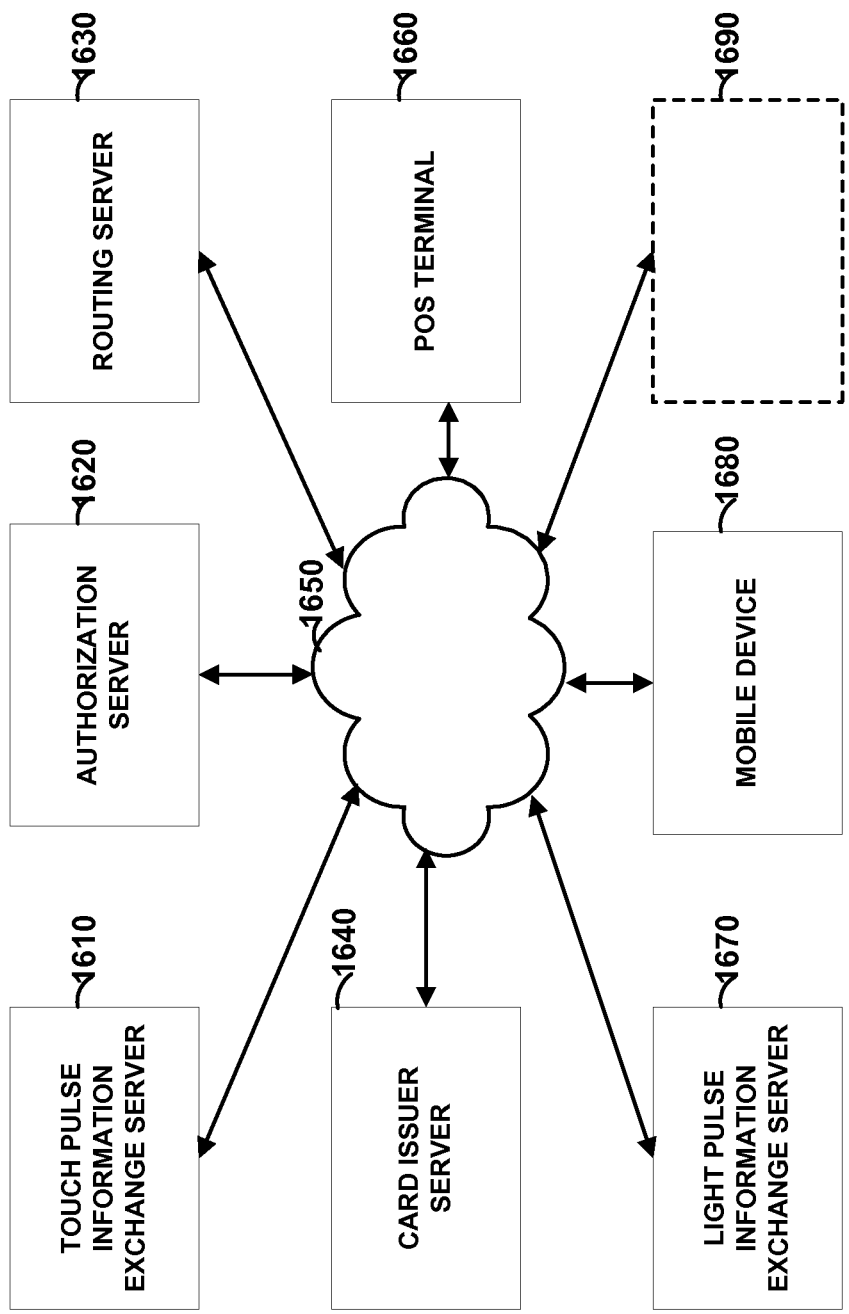
FIG. 16 is an illustration of a network topology constructed in accordance with the principles of the present invention.

FIG. 16 shows topology 1600 that may include touch pulse information exchange server 1610, card issuer server 1640, light pulse information exchange server 1670, communication network 1650, authorization server 1620, routing server 1630, POS terminal 1660, mobile device 1680 (e.g., a battery-powered card, a mobile telephonic device, or computing device), and any other device 1690 (e.g., a promotional issuance or rewards management server).

Figure 17:
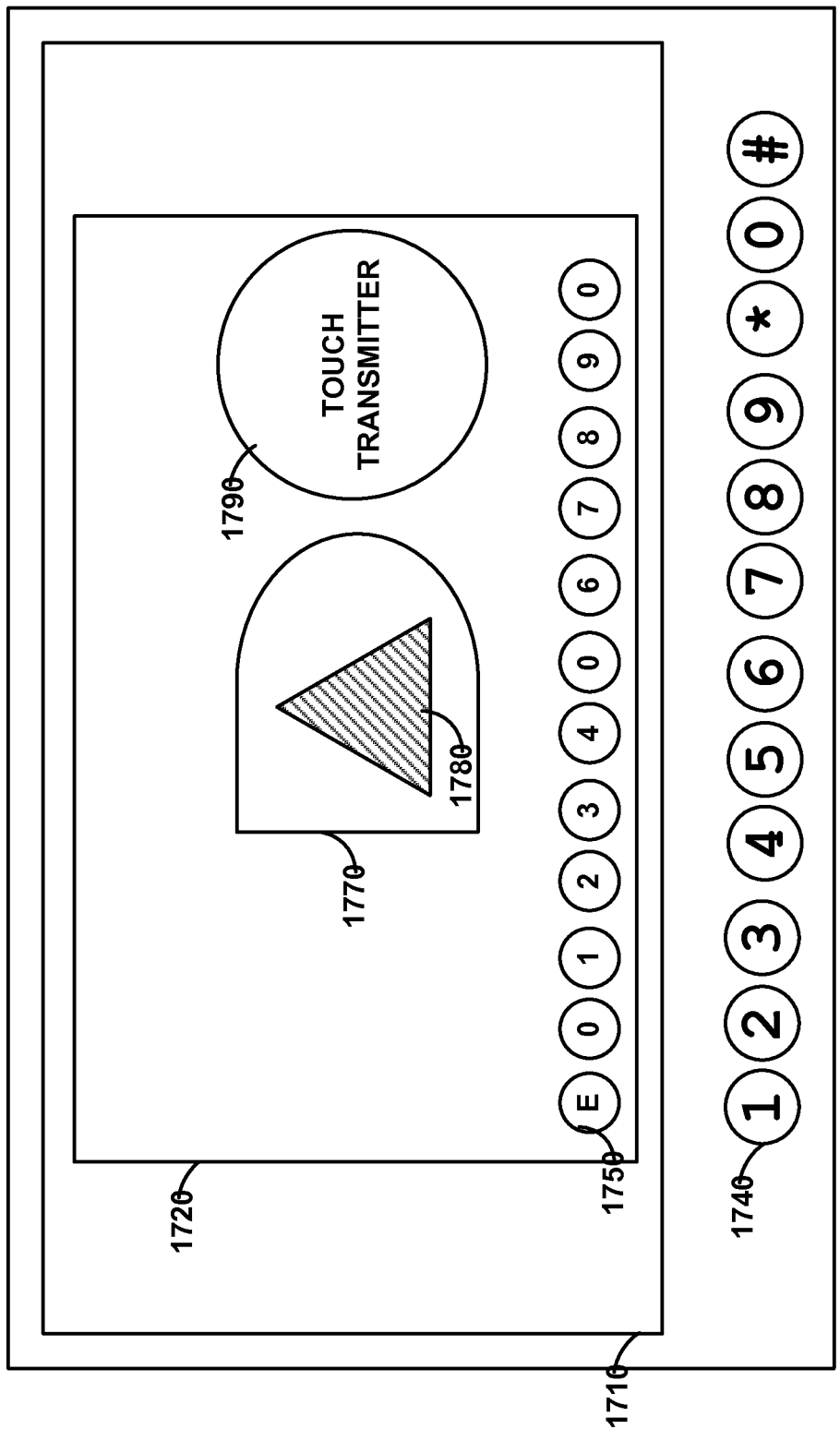
FIG. 17 is an illustration of a device constructed in accordance with the principles of the present invention.

FIG. 17 shows device 1700 which may be, for example, a mobile phone having a touch sensitive display 1710, physical buttons 1740, and virtual capacitive touch buttons 1750 on virtual card 1720. Light communications may occur, for example, in area 1780 of indicia 1770. One or more capacitive touch sensors may also, for example, be controlled to communicate touch pulses (e.g., touch transmitter area 1780).

Persons skilled in the art will also appreciate that the present invention is not limited to only the embodiments described. Instead, the present invention more generally involves dynamic information. Persons skilled in the art will also appreciate that the apparatus of the present invention may be implemented in other ways then those described herein. All such modifications are within the scope of the present invention, which is limited only by the claims that follow.

What is claimed is:

1. A card comprising:
   a processor;
   memory; and
   a touch transmitter including a conductive plate, said processor operable to electrically communicate information stored in said memory to a touch sensitive screen via control signals received from said processor, wherein said processor is operable to change a capacitance of said conductive plate relative to a threshold, said change being at least one selected from the group consisting of below a capacitance threshold and above a capacitance threshold.

2. The card of claim 1, wherein said information is payment information.

3. The card of claim 1, wherein said touch transmitter includes a transistor coupled to said conductive plate, wherein said processor deactivates said transistor to decrease said capacitance of said conductive plate below said capacitance threshold.

4. The card of claim 1, wherein said touch transmitter includes a transistor coupled to said conductive plate, wherein said processor activates said transistor to increase said capacitance of said conductive plate above said capacitance threshold.

5. A card comprising:
   a processor;
   memory; and
   a touch transmitter, said processor operable to electrically communicate information stored in said memory to a touch sensitive screen via control signals received from said processor,
   wherein said touch transmitter includes a transistor having an isolation circuit coupled between a control terminal of said transistor and said processor.

6. A system comprising:
   a card including a touch transmitter with a conductive plate; and a device including a touch-sensitive screen,
wherein said touch transmitter is operable to communicate information from said card to said device via said touch sensitive screen, and
said card is operable to change a capacitance of said conductive plate relative to a threshold, said change being at least one selected from the group consisting of below a capacitance threshold and above a capacitance threshold.

7. The system of claim 6, wherein said information is payment information.

8. The system of claim 6, wherein said information is payment information used by said device to complete a purchase transaction.

9. The system of claim 6, wherein said information is authentication information.

10. The system of claim 6, wherein said information is authentication information used by said device to authorize a function performed by said device.

11. The system of claim 6, wherein said touch-sensitive screen includes a predetermined location operable to receive said communicated information.

12. The system of claim 6, wherein any portion of said touch-sensitive screen is operable to receive said communicated information.

13. The system of claim 6, wherein said touch-sensitive screen includes a status indicator operable to indicate a status of said communicated information.

14. The system of claim 6, wherein said touch-sensitive screen includes a status indicator operable to indicate a status of said communicated information, wherein said status indicator indicates whether said communicated information is received.

15. The system of claim 6, wherein said touch-sensitive screen includes a status indicator operable to indicate a status of said communicated information, wherein said status indicator indicates whether said communicated information is valid.

16. A method comprising:
activating a button to initiate communication;
placing a card against a device;
simulating a touch by said card;
detecting said simulated touch by said device; and
storing said detection within said device as data communicated by said card to said device,
wherein simulating a touch includes increasing a capacitance of a conductive plate of said card above a capacitance threshold.

17. The method of claim 16, wherein said communicated data is payment information used by said device to complete a purchase transaction.

18. The method of claim 16, wherein said communicated data is authentication information used by said device to authorize a function performed by said device.

19. The method of claim 16, further comprising providing feedback from said device indicative of a status of said detection.

* * * * *